United States Patent [19]

McDonald et al.

[11] Patent Number: 5,978,582

[45] Date of Patent: Nov. 2, 1999

[54] METHOD AND SYSTEM FOR IMPLEMENTING SOFTWARE OBJECTS

[76] Inventors: Marc B. McDonald, 3353 72nd Pl. SE., Mercer Island; Michael B. Orr, 7009 NE. Dolphin Dr., Bainbridge Island, both of Wash. 98110

[21] Appl. No.: 09/169,568

[22] Filed: Oct. 9, 1998

Related U.S. Application Data

[63] Continuation of application No. 08/546,316, Oct. 20, 1995, Pat. No. 5,822,587.

[51] Int. Cl.[6] .............................. G06F 12/00; G06F 19/00
[52] U.S. Cl. ......................... 395/702; 395/703; 345/433; 707/100
[58] Field of Search ..................................... 395/702, 703, 395/705, 709, 682, 683; 345/433, 326, 339, 340; 707/100, 104, 205, 505, 509

[56] References Cited

U.S. PATENT DOCUMENTS

| | | | |
|---|---|---|---|
| 5,161,225 | 11/1992 | Abraham et al. | 707/103 |
| 5,247,669 | 9/1993 | Abraham et al. | 707/103 |
| 5,313,636 | 5/1994 | Noble et al. | 395/700 |
| 5,487,141 | 1/1996 | Cain et al. | 345/435 |
| 5,499,365 | 3/1996 | Anderson et al. | 707/203 |
| 5,537,630 | 7/1996 | Berry et al. | 345/326 |
| 5,560,014 | 9/1996 | Imamura | 395/701 |

*Primary Examiner*—Frantzy Poinvil

[57] ABSTRACT

A system for implementing software objects using an object-prototype model. Objects are defined as collections of properties, each having a unique property name. A collection of property names defines a "shape." The use of shapes frees the representation of an object in memory from the order in which the properties of the object are declared. Methods are defined independently of objects and are applicable to a specified shape, rather than to objects that are derived from a class in which the method is defined. Methods can be applied to any object that has the specified shape or that has a superset of the properties defining the specified shape, regardless of the place of the object in any inheritance hierarchy. The definition of a shape can also include additional selection criteria, such as restrictions on the values of properties, so that the application of a method can be restricted to objects satisfying the specified criteria. The properties of objects can be divided into subgroups representing different aspects of the object and different subgroups of an object can be inherited from different parent objects, based upon either a has-a or an is-a hierarchy. The shape of an object is determine by all of its properties and is not confined by subgroup boundaries.

6 Claims, 23 Drawing Sheets

FIG. 1A
(Prior Art)

| Airplane | Properties |
|---|---|
| | Engine |
| | MaxAirspeed |
| | Range |
| | Wingspan |
| | Ceiling |
| | FuelCapacity |

| Boat | Properties |
|---|---|
| | Engine |
| | Beam |
| | Speed |
| | HullType |
| | Draft |
| | FuelCapacity |

| Seaplane | Properties |
|---|---|
| | Engine |
| | MaxAirspeed |
| | Range |
| | Wingspan |
| | Ceiling |
| | FuelCapacity |
| | Engine |
| | Beam |
| | Speed |
| | HullType |
| | Draft |
| | FuelCapacity |

| Property Name Table ||
|---|---|
| Property Name Index | Name |
| 1 —122 | Visible —124 |
| 2 —122 | Bounds —124 |
| 3 —122 | Caption —124 |
| 4 —122 | FontSize —124 |
| 5 —122 | Filled |
| 6 | Color |
| 7 | Page |
| 8 | Columns |

FIG. 8

Shape Table Using Property Name Index Numbers

| Shape Index | Properties | | Convertible to: | Convertible to: |
|---|---|---|---|---|
| | Property Name Table Indices | Within-Object Property Number | | |
| 1 | 1 (Visible)<br>2 (Bounds)<br>3 (Caption)<br>4 (FontSize) | 1<br>2<br>3<br>4 | Shape 3 Map Table<br>1 → 1<br>4 → 2 | |
| 2 | 5 (Filled) | 1 | | |
| 3 | 1 (Visible)<br>4 (FontSize) | 1<br>2 | | |
| 4 | 1 (Visible)<br>2 (Bounds)<br>3 (Caption)<br>4 (FontSize)<br>6 (Color) | 1<br>2<br>3<br>4<br>5 | Shape 1 Map Table<br>1 → 1<br>2 → 2<br>3 → 3<br>4 → 4 | Shape 3 Map Table<br>1 → 1<br>4 → 2 |
| 5 | 4 (FontSize)<br>7 (Page) | 1<br>2 | | |
| 6 | 4 (FontSize)<br>8 (Columns) | 1<br>2 | | |

FIG. 14

| | | Memory Structure of ColorButton Object Using Values and Pointers |
|---|---|---|
| Shape Index | | 4 ⟋ 200 |
| Behavior For Object | | List of, and references to, methods possibly applicable to the ColorButton Object ⟋ 204 |
| Within-Object Property Number | 1 ⟋ 156 | Yes ⟋ 202 |
| | 2 ⟋ 156 | Red ⟋ 202 |
| | 3 ⟋ 156 | (0,0) to (10,10) ⟋ 202 |
| | 4 ⟋ 156 | "Lincoln Delivering the Gettysburg Address" ⟋ 202 |
| | 5 ⟋ 156 | 10 point ⟋ 202 |

| | Memory Structure of ColorButton Object |
|---|---|
| Shape Index | 4 — 200 |
| Behavior for Object | List of, and references to, methods — 290 possibly applicable to the ColorButton Object, including methods to get and set property values of the ColorButton Object |
| Data | Property values accessible by methods in object's behavior list — 292 |

— 288

METHOD AND SYSTEM FOR IMPLEMENTING SOFTWARE OBJECTS

RELATED APPLICATION

This application is a continuation of U.S. application Ser. No. 08/546,316, filed Oct. 20, 1995 now U.S. Pat. No. 5,822,587.

TECHNICAL FIELD

This invention relates generally to the field of computer programming language translators and more specifically to compilers and interpreters having object-oriented features.

BACKGROUND OF THE INVENTION

To cope with the rising complexity of computer programs, many modern programming languages use discrete programming structures called "objects" that present well-defined interfaces to the outside programming environment and are, in principle, self-contained. Objects typically contain information and methods that operate on the contained information or external information.

The pieces of information associated with an object are referred to as "properties" of the object. Each property has a name and can be assigned a value. The type of datum that can be assigned to a property as its value may be, for example, a datum of a simple type, such as an integer or a floating point number, or a datum of a complex type, such as a data structure or another object. When an object is defined, a programmer typically declares the properties that the object contains and specifies the data type for each property. The data type of a property indicates the type of data that the property can represent. For example, a property of the type "integer" can have values 1, 2, 3, etc., whereas a property of the type "pointer to a method" contains a memory address of the beginning of a set of instructions. The properties of an object collectively define its structure.

Each property of an object has associated attributes, such as its name, type, accessibility (e.g., in C++: public, protected, or private), and position within the object. The values of these attributes are not typically accessible to the programmer, i.e., a programmer cannot typically query an object to determine its type or its availability. In C++, a programmer can query the size of a property and could indirectly determine its position within an object by subtracting a pointer to the property from a pointer to the object. The inability to determine attributes of an object further limits programmers from specifying how a program will function.

A method comprises one or more lines of computer code that perform an operation. A method is typically executed by departing from the sequential execution of program lines at the point of the method call, jumping to the lines of code constituting the method, and then returning to the sequential execution of the program below the method call. In object-oriented programming, methods are typically defined as part of a class definition and can be applied only to objects of the defining class, or objects of classes derived from the defining class. The methods that can be applied to an object are collectively called the "behavior" of the object.

One fundamental goal of object-oriented programming is to encapsulate properties and methods within an object so that a second programmer can use an object defined by a first programmer after learning only the interface of the object. The interface contains code needed to send data to an object and to receive output, such as calculation results, error codes, and object status, from the object. The second programmer should not need to understand the internal workings of the object. Programmers should, therefore, be able to write programs that access objects defined by other programmers and reuse previously defined objects as building blocks of new programs. For example, once a programmer defines an object that represents an automated teller machine, another programmer should be able to use the automated teller machine object in different programs that, for example, model the same automated teller machines in a different banking network. Encapsulation of objects also allows a programmer to modify the internal workings of a particular object to eliminate an error or improve efficiency without having to change other parts of the program that use the object. Encapsulation thus reduces complexity in large programming endeavors.

Another fundamental goal of object-oriented programming is extensibility, i.e., allowing previously created objects to be extended to include additional properties or functionality. This is accomplished by allowing one object to inherit properties and methods from another source, such as a parent object. For example, if a new type of automated teller machine having additional features becomes available, a programmer should be able to easily create, based upon an existing automated teller machine object, a new automated teller machine object that has additional properties and materials representing the additional features. By eliminating the duplication of programming efforts, inheritance allows existing object-oriented code to be expanded into new uses. Inheritance also facilitates building complex objects from relatively simple building blocks.

The class-instance programming model is one technique for implementing software objects. In the class-instance programming model, abstract objects, known as class objects, are defined, and then instances of the class can be declared. A class object defines the structure and methods of instances of the class, but properties in the abstract class itself do not have values. An instance of a class is an object having the structure defined by the class and capable of being assigned property values. All instances of a class, therefore, have a separate memory structure for storing the property values of that instance. Unlike properties, there is typically only one copy of each of the methods of a class. Method calls, therefore, typically include as an "invisible parameter" an indication of which instance of the class is calling or being passed to the class method.

To facilitate the creation of new classes in the class-instance programming model, a "child" class can be defined that is derived from and inherits the structure of its parent class. An instance of the child class would, therefore, have all the properties and methods defined in the parent class and any additional properties and methods defined specifically in the child class. For example, a class "Vehicle" may have derived from it a child class "Spacecraft," an instance of which is a particular spacecraft, e.g., the space shuttle Discovery. Because the child class (Spacecraft) is a specific type of the more general parent class (Vehicle), this type of inheritance is known as an "is-a" inheritance.

To take advantage of inheritance, object-oriented programming languages are often sold with libraries of pre-defined abstract classes that aid programmers in building new classes and that promote use of standardized objects to build application software. Class libraries theoretically greatly simplify creation of new software.

Many programming languages allow multiple inheritance, i.e., inheriting properties and methods from more than one parent object. For example, FIGS. 1A, 1B, and 1C show, respectively, an "Airplane" class 10, a "Boat" class 12, and a "Seaplane" class 14 that inherits from the Boat and Airplane classes. FIG. 1C shows that the memory structure 16 of an instance of the derived Seaplane class 14 is a concatenation of the memory structures 18 and 20 of Boat class 12 and Airplane class 10, respectively, the concatenation being performed in the order that the inheritance was declared. (The heavy lines of FIGS. 1A, 1B, and 1C enclose the actual memory structures and separate them from label information included in the drawings to facilitate understanding of the prior art and the invention. This convention is also followed in other figures in this specification.) Thus, properties having the same name in multiple parent classes are typically inherited in the children as separate properties. With duplicate method names, however, one method will override another and only one method will be inherited.

Unfortunately, multiple inheritance can cause encapsulation to break down in complex programming environments. One difficulty arises because inheritance lacks granularity, i.e., it is an all-or-nothing proposition. A derived class inherits the entire set of properties and methods of its parent class or classes; a child class cannot inherit only specified properties or methods from individual parents. The following example illustrates the point.

FIG. 2A shows an airplane 24, having an engine 22, a fuselage 26, landing gear 28, wings 30, a rudder 32 and a propeller 34. FIG. 2B shows a boat 36 having a hull 38, a mast 40, a sail 42, an anchor 44, a rudder 46 and riggings 48. In accordance with prior art multiple inheritance, Seaplane class 14 inherits all the properties and methods of Airplane class 10 and Boat class 12, even if some of the properties are redundant or inappropriate for a Seaplane.

FIGS. 2C and 2D illustrate the absurdity of all-or-nothing inheritance. All the components of Boat 36 and Airplane 24 are force-fit into a composite seaplane. FIG. 2C shows a Seaplane 50 that inherited first from Boat 36 and then from Airplane 24. FIG. 2D shows a Seaplane 52 that inherited first from Airplane 24 and then from Boat 36. In both cases, the Seaplane object has some inappropriate properties, such as a Sail 42, and duplicate properties, such as Rudders 32 and 46, Rudder 32 being an aircraft rudder and Rudder 46 being a boat rudder. When a programmer refers to the Rudder property of the Seaplane object, it is unclear which rudder will be referenced.

To avoid some of the absurd results from multiple inheritance and produce a useful derived class, it is sometimes necessary to modify one or more of the parent classes. For example, it may be necessary to change Boat class 12 by eliminating Sail 42 to produce a derived Seaplane class that accurately models a Seaplane. Changing Boat class 12, however, can have consequences in other parts of a program that use objects that inherit properties and methods from the original Boat class 12. For example, a programmer would be required to track down other objects and classes that inherit from the modified Boat class to ensure that other sections of the program are not unintentionally affected. Needing to understand and modify the internal definitions of parent classes is anathema to the concept of encapsulation, which dictates that objects be self-contained so that users of an object need not understand the internal workings of the object. Moreover, changes to a class object in a class library will often require not only recompilation of the library itself, but also recompilation of existing software that uses the changed class object. The problems demonstrated by the foregoing example arise in part because a programmer cannot specify which aspects of a derived class will be inherited from one parent class and which aspects will be inherited from another parent class. A small modification in a parent class may be inappropriate if inherited in all instances of child classes and a modification cannot be made to a single instance if class inheritance is used to provide the change.

If a particular property name or method name appears in more than one parent object, the method that will be inherited and the order of properties in the child class depends upon the order of inheritance and upon arbitration rules. For example, a programmer may wish to define a class E (FIG. 3) that inherits properties and methods from classes C and D, which are defined in two different class libraries, possibly from different software manufacturers. If some of the properties or methods in class A have the same names as properties or methods in class B, the methods and order of properties in classes C and D will depend on the order of inheritance from classes A and B. To function properly, class C may require that a method be inherited from class A, rather than from class B, or that the properties in class C be in a particular order. In the multiple inheritance example of FIG. 3, in which class E inherits from classes C and D, each of which inherits in a different order from classes A and B, it is very difficult to determine the resulting methods and property order in class E. In some cases, class E may be defective because a method inherited from class C may depend upon a property being inherited first from class B, whereas a method inherited from class D may depend upon the same property being inherited first from class A.

Applying arbitration rules to objects having multiple parent classes, each of which can also have multiple parents, can quickly become very complex. The arbitration rules require a detailed knowledge of the structure of the parent classes in the inheritance tree. Because complex classes in class libraries are often built upon simpler classes in the library, a programmer may need to understand the structure of many of the classes in the library before he or she is able to predict how an object he or she creates using class objects from the library will function.

For this reason, programmers that produce class libraries typically provide source code for their class libraries so that applications programmers can determine the inheritance order and redefine classes in the library if necessary. To require knowledge of the parent objects and of complex arbitration rules greatly increases the complexity of object-oriented programming and related source code, vitiates the purpose of encapsulation, and reduces the reusability and extensibility of code. This defeats the purpose of having extensible objects as a result of encapsulation and inheritance and requires extensive knowledge of preexisting class libraries by the programmer.

The complexity and inflexibility of inheritance in languages such as C++ derives in part from the close relationship between the memory structure in which an object is stored and its class definition. As shown in FIG. 1C, a child object is stored in memory as a concatenation of the objects from which it derives. This allows the child object to be "type cast," i.e., treated as though it were of the same object type as the parent object. Such a system, however, requires that all properties of an object be inherited to maintain the relationship in memory of the different components of a derived object. The rigid memory structure in which properties of objects are stored in the order in which they are declared and inherited also constrains the allocation of memory by a compiler, thereby causing inefficient use of available memory. The compiler is not free to reorder or eliminate duplicate properties when such reordering or elimination of duplication would produce more efficient memory usage.

The object programming model is another technique for implementing software objects. In the object programming model, objects are defined and can then be copied or used to derive other objects. This technique differs from the class-instance model in that there are no abstract classes. In some respects, the object model is more flexible because objects are independent entities and can be created and modified independently of any definition of abstract classes. Moreover, methods can be attached to individual objects, rather than to all members of a class. The object model is also consistent with the use of visual programming tools, such as Microsoft's Visual Basic™, to create graphical user interfaces. In using such tools, programmers can create, for example, menu objects on the screen, without having to first create an abstract menu class.

In the object model, objects can be created by copying them from other objects, but there are no links between the original object and the newly created object which receives the defined structure and assigned property values from the original object. Property values in the new object do not change when property of the original is changed. Visual Basic™, Asymetrix's Toolbook™, and Apple's Hypercard™ are examples of applications based upon an object model without is-a inheritance.

A variation on the object programming model, the object-prototype programming model, provides for inheritance. When the value of a property of a parent object changes, the corresponding property in the child object also changes. A child object in the object-prototype model inherits from a particular parent object, rather than from an abstract class as in class-instance model inheritance, thereby allowing an object to inherit actual property values, in addition to structure. As in the class-instance model, inheritance in the object-prototype model is typically based upon an is-a hierarchy, i.e., a derived object is a type of the parent object. Applications using the object-prototype models are not in widespread commercial use.

Another approach to object-oriented language architecture is the use of a containment, or "has-a," hierarchy as opposed to an is-a hierarchy. In a containment hierarchy, a child object is contained in a parent object, instead of being a type of the parent object. An object is contained within only a single container, although the parent container can itself be contained within another container.

Most implementations do not allow inheritance from the parent in a container hierarchy. In some applications, such as Hypercard™ and Toolbook™, when a method cannot be found associated with an object, the container of the object is checked to determine whether the container defines the method. Such a technique can be considered inheritance of methods from a parent container.

In summary, the class-instance programming model uses abstract classes that define a structure and methods. The structure and methods of one or more abstract classes can be inherited by a child abstract class. Inheritance in the class-instance model is based upon an is-a hierarchy, in which child classes are a type of the parent class and a child class inherits everything in its parent class or classes. Instances, which include property values, are created from the abstract classes, but instances cannot be derived from other instances. Therefore, structure and methods can be inherited, but property values cannot be. This restricts reusability and makes the programmer's task more complex. Expert knowledge of complex rules of arbitration and of the parent classes are often required to create specific child classes and to understand inherited behavior.

In the object programming model, objects can be copied from other objects, so structure, behavior, and data can be derived. Object systems allow copying of objects, but do not provide for inheritance. Object-prototypes systems provide for inheritance, with the inheritance hierarchies based upon is-a relationships in which each child is a type of the parent. In some applications, limited inheritance of methods is based upon has-a relationships, in which each child is contained in the parent. Has-a inheritance relationships are generally inconsistent with inheritance of property values.

Although the mission of object-oriented programming is to create modular applications using reusable and extensible objects, this promise remains largely unfulfilled in standard object-oriented programming. Classical object-oriented programming is hampered by the complexity of native object classes adopted by programming languages (such as C++), which complexity results in well-known problems in object definition and encapsulation and the related difficulty in dynamically changing objects and methods during application run-time.

Recognizing problems with multiple inheritance in the standard object-oriented language architecture, the prior art takes several approaches to programming unique objects, including binding objects at run-time, modifying and recompiling parent class libraries, and writing custom code to override the inherited properties or methods and assert the class membership of a branch object instead of letting the program architecture determine inheritance. The properties and behavior of an object, however, become dependent on its parent classes and its custom coding, thereby causing difficulty in determining how the object will behave. Complexity of the program architecture increases. The apparent solutions treat only the symptoms and produce further difficulties of their own, making it difficult to create code that is reusable and extensible by other developers.

As a result, current object-oriented programming systems require knowledge of complex rules for arbitrating inheritance and require that a programmer learn entire native class libraries to obtain consistent behavior from objects, determine inheritance, and debug code.

SUMMARY OF THE INVENTION

An object of the present invention is, therefore, to provide a programming language system that allows for improved methods of encapsulation and multiple inheritance.

An advantage of this invention is that it can provide such a system in which the behavior of objects can be determined from the objects themselves without resort to their inheritance hierarchy.

Another advantage of this invention is that it can provide for selective inheritance of properties from a parent object or of different properties from different parent objects.

A further advantage of the invention is that it can provide for inheritance of properties based upon the container or containers in which an object is placed.

Still another advantage of this invention is that it can provide for object behavior that is limited to objects whose properties have specified values.

The present invention constitutes a novel computer-implemented system for organizing, storing, and processing data. The system of the present invention simplifies conventional object-oriented programming, thereby increasing programmer efficiency and facilitating the implementation of complex programming models. This has application in fields, such as information management, graphics presentation, and networking, in which the objects that operate together are complex and not easily accessible to the programmer.

The system is based upon an object-prototype model. According to the present invention, an object is defined as a set of properties, which set defines the "shape" of the object. Behavior is defined independently of objects and is also defined in association with a particular set of properties, which set defines the "shape" of the behavior. Behavior can be applied to objects that have the same shape as the behavior or to objects that have shapes that are convertible to the shape of the behavior. A first shape is convertible to a second shape if the properties comprising the first shape are a superset of the properties comprising the second shape. The applicability of behavior can be further restricted to objects that meet criteria specified by a programmer, such as objects having specified property values or objects that occupy a specified place in a containment hierarchy.

Thus, unlike typical object-oriented programming models, behavior is not defined as member functions of a class of objects or in association with particular objects: A method can be applied to any object that includes the properties to which the method applies. Such a model is analogous to real world systems, in which behavior, such as acceleration caused by gravity, applies to any object that has the appropriate property, i.e., mass, regardless of how the object was derived.

In a preferred embodiment, property names are unique within an application and are listed in an indexed property name table, which provides a property name table index number for each property name and a canonical order for listing properties that comprise any shape. A shape table is maintained that includes entries listing the properties corresponding to each unique object shape and a list of other shapes to which each entry can be converted. An index into the shape table is included in part of the memory structure for each object. The shape table is used to indicate the position of properties within each object and, in some embodiments, to provide a means for converting between shapes.

When a method is called to operate on an object, the method tests the object to determine whether it is of the proper shape or whether it can be converted to the proper shape. If the shape of the object is acceptable, the method tests the object to determine whether it satisfies restrictions, if any, placed on the method, such as requiring that a property of the object have a specified value. If the object passes the tests, it is executed.

Another aspect of the present invention allows different properties of an object to be declaratively inherited from different parent objects. A set of properties within an object can be grouped together and treated as a specific aspect of the object. Such an aspect will be referred to as a Facet™-type property subgroup. Different Facet™-type property subgroups of the object can be inherited from different parent objects. Inheritance of a property within a Facet™-type property subgroup can be based upon an is-a or has-a relationship. Property values inherited based upon an is-a relationship are independent of the location of the object, and the parent of each Facet™-type property subgroup is determined by declaration. Property values inherited based upon a has-a relationship will derive from the parent object or objects in which the child object is placed.

An object may be placed in more than one container parent, with properties within each of the Facet™-type property subgroups of the object being inherited from a different one of its parent containers. The parent from which each Facet™-type property subgroup can be specified. Alternatively, when a child object is contained in multiple parents, each child object Facet™-type property subgroup is inherited from the parent in which the child object is contained in a parent object Facet™-type property subgroup having the same name as the child object Facet™-type property subgroup. Individual properties within a Facet™-type property subgroup can be declared as inherited or not inherited. The values of properties that are not inherited will be independent of the property values in the parent object. Thus, the properties that a child object inherits is controlled by the child object itself: by its place in a container object and by declaration in the child of which properties are inherited from the parent.

By specifying inheritance at the level of Facet™-type property subgroups and individual properties, a programmer can define an object to behave the way he or she wants; the properties and behavior of an object will not depend on arbitration rules operating on complex multiple inheritance hierarchies. A programmer can understand the properties and behavior of an object by looking at its declaration without having to understand the complete class library upon which it is based. The present invention thus greatly improves encapsulation in object-oriented programming.

As a further advantage, the shape of an object, which determines which methods can be applied to the object, is not restricted by Facet™-type property subgroup boundaries. A method, therefore, will apply to any object having specific properties, although the properties reside in different Facet™-type property subgroups and can be inherited from different parents.

The memory structure of an object of the present invention is independent of the order of properties in the object declaration. This independence provides flexibility to a compiler in allocating memory and frees the compiler to perform optimizations that were heretofore impractical. For example, the compiler can share memory structures among different objects, such as a parent and child objects. Declarations may be constructed using indexing, linked or nested lists, or such other data memory constructs appropriate to optimize compilation.

By utilizing shapes to allow a programmer to control the applicability of methods and Facet™-type property subgroups to allow a programmer to control inheritance, the method and object implementation engine of present invention provide a programmer with multiple viewpoints of a software object and eliminates ambiguities in manipulating the objects from a particular point of view. The invention thus provides a uniquely extensible, scalable application development architecture that is widely applicable to programming applications that use objects. Applicants use the term "object" term to apply generally to any software construct having properties and behavior, and the invention is not limited to constructs that fit the formal definition of an object as defined in any particular system.

Additional objects and advantages of the present invention will be apparent from the following detailed description of a preferred embodiment thereof, which proceeds with reference to the accompanying drawings.

BRIEF DESCRIPTION OF THE DRAWINGS

FIGS. 1A, 1B, and 1C show three prior art software objects, with the object in FIG. 1C inheriting properties from the objects of FIGS. 1B and 1C.

FIG. 7 is an example of a property name table used in the preferred embodiments of the present invention.

FIG. 8 is a conceptualized example of a shape table used in certain embodiments of the present invention.

FIG. 14 shows an object memory structure used in a second embodiment of the present invention.

FIG. 16 shows an object memory structure used in a third embodiment of the present invention.

DETAILED DESCRIPTION OF PREFERRED EMBODIMENTS

In a computer implemented system of the present invention, an object declaration includes a name for the object and a set of properties. The set of properties is called the "shape" of the object. Methods are declared as being applicable to a specified shape, but not necessarily to a particular object. A method can be applied to any object that has the specified shape or to any object whose shape can be converted to the specified shape. A second shape can be converted to a specified shape if the properties of the second shape are a superset of the properties of the specified shape. The applicability of a method can also be restricted to objects meeting specified criteria. Although the present invention provides for inheritance of properties from other objects, the applicability of methods to a particular object is not generally limited to objects having a particular ancestry, as in prior art object-oriented languages such as C++.

The applicability of methods to objects in the present invention is thus determined by the properties of the objects, rather than how the objects were derived. A programmer, therefore, is not required to analyze complex inheritance trees and arbitration rules to determine which methods will be available to an object; he or she need only compare the shape of the object and the shape of the method.

The present invention can be implemented in a number of different ways. Different embodiments allocate the computing overhead differently between compile-time and run-time. The steps used to implement the invention may be carried out, for example, by a compiler at compile-time, by an interpreter at run-time, by a run-time system, or by any combination of these. Techniques that depend on run-time operations are typically more flexible, but run more slowly than techniques that bind methods and property values at compile-time. The preferable allocation of computing overhead depends upon the application, and no particular implementation is considered to be better for all applications. In the description below, the term "system" is used to mean the program, such as a compiler, interpreter, run-time system, or combination thereof, that is carrying out the steps of the invention.

Defining Objects

Figure 4:
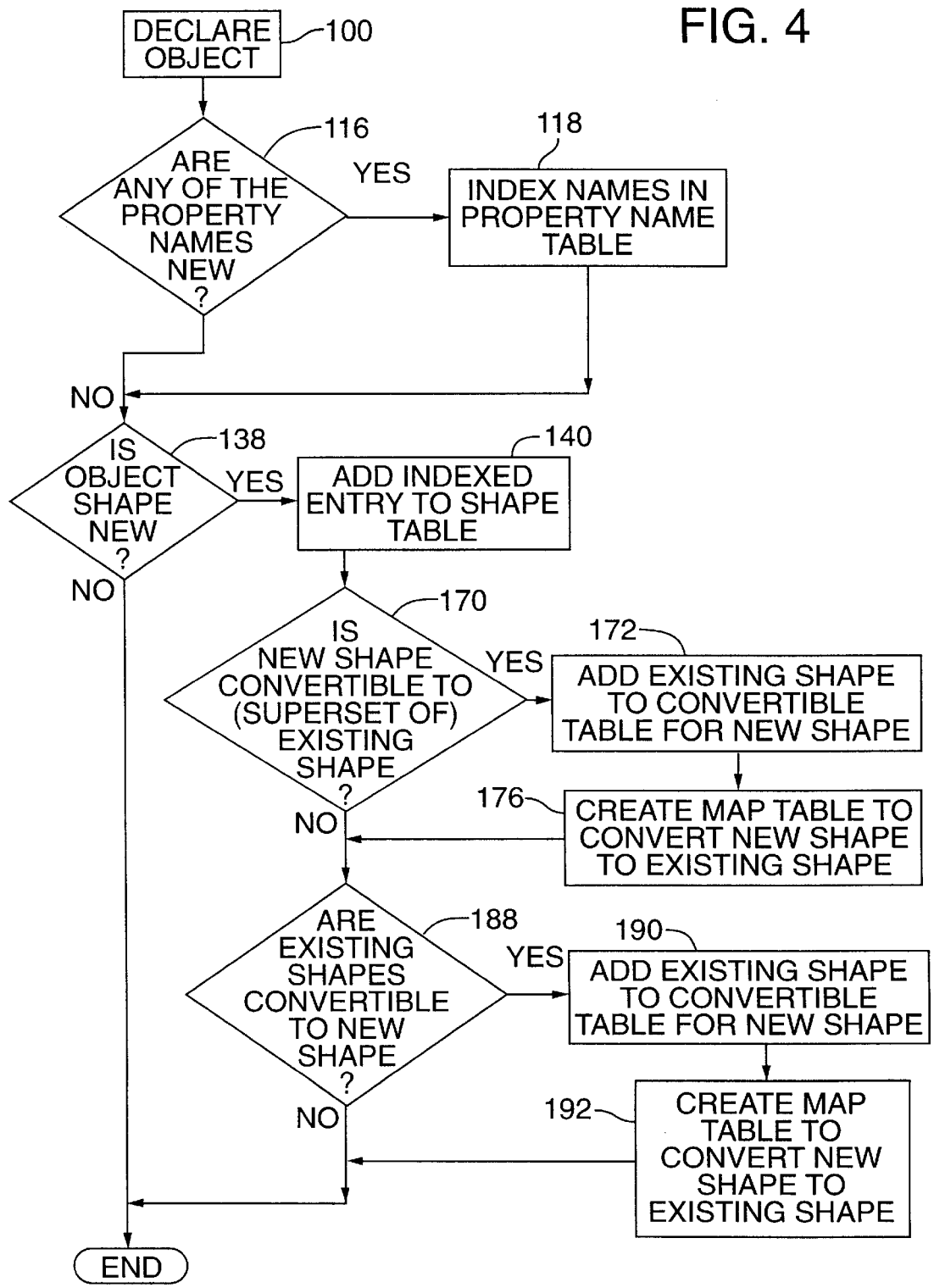
FIG. 4 is a flow chart showing the steps entailed in the creation of a new object in a first preferred embodiment of the invention.
Figure 5:
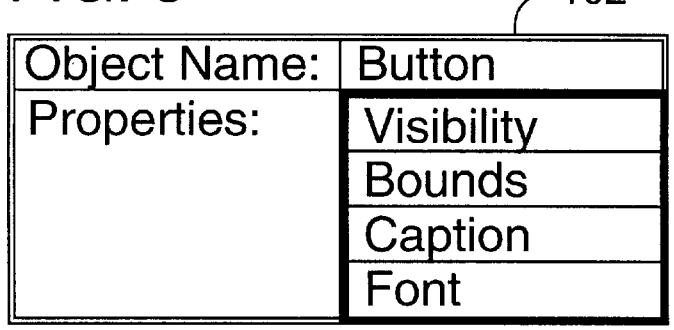
FIG. 5 is a chart showing a typical object, Button, of the present invention.
Figure 6:
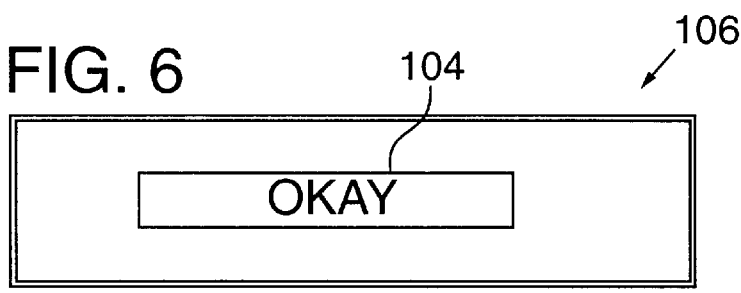
FIG. 6 shows a button used as part of a graphical user interface and represented by the object in FIG. 5.

In a programming system of the present invention, a programmer separately defines objects and behavior, described below with respect to FIGS. 4–8. FIG. 4 is a flow chart showing the steps entailed in creating a new object in a first embodiment of the present invention. In step 100, an object is declared by naming it and providing it with a group of properties. For example, a programmer may define an object 102 called "Button" shown in FIG. 5 to represent a button 104 used as part of a graphical user interface 106 shown in FIG. 6. FIG. 5 shows Button object 102 as having the following properties: Visibility, Bounds, Caption, and Font.

A list of all properties of all declared objects is maintained in a property name table 108, an example of which is shown in FIG. 7. Step 116 shows that when an object is declared, the names of properties declared to be part of the new object are compared with the property names existing in property name table 108 to determine whether the property names declared with the new object already exist.

Step 118 shows that any property names not already listed in property name table 108 are entered in the table and indexed. Property name table 108 thus includes an entry 120 having a unique property name table index number 122 for each unique property name 124. If multiple objects include the same property, there is only one entry in property name table 108 for the property.

After an entry is created in property name table 108, the system will replace all subsequent uses of the property name 124 with the corresponding property name table index number 122 from property name table 108. Replacing property names with index numbers speeds program execution because it is much quicker for a computer to find and compare integer index values than to find and compare alphanumeric strings of arbitrary lengths. Moreover, property name table index numbers provide a natural or canonical order for referencing properties within a shape, thereby eliminating the need to check permutations of property orders when searching for or comparing shapes.

When an object is declared, the system defines the object shape using the canonical order of the properties, regardless of the property order specified by the programmer in the declaration. The memory structure of an object is, therefore, unlike prior art systems, not determined by the order of properties in the object declaration. For example, if a first object is declared to have properties Visible, Bounds, and Caption, those property names will be entered into property name table 108. If a second object is declared to have the properties FontSize, Caption, and Bounds, the new property, FontSize, will be entered into property name table 108 and the properties of the second object will be ordered as Visible, Caption, and FontSize. Similarly, an object declared as having properties FontSize, Caption, and Visible will be considered to have the same shape as another object declared as having the properties Visible, Caption, and FontSize.

In prior art programming systems, a programmer could short-cut data encapsulation by using pointers and his or her knowledge of the internal memory structure of an object. This practice, although often useful, is considered to be a poor programming technique because changes in a part of a program that defines the object can cause failure in the section using the shortcut. By divorcing the memory structure from the order in the declaration, a programmer is prevented from taking this undesirable shortcut because the programmer will not know the order in which properties of an object are stored. Moreover, the separation of structure from declaration order allows the system to reorder the property name table to reduce the computing required to convert between shapes.

Defining Behavior

The behavior of an object comprises the set of methods that applies to the object. In the present invention, behavior is typically defined to apply to a specified shape, rather than to a particular object. The behavior is then applicable to any object having the specified shape or having a shape that is convertible into the specified shape in the behavior definition. Speaking figuratively, when behavior is declared, it is "painted" or "screened" over existing objects of the specified shape or of a convertible shape.

Methods are defined within a behavior clause that specifies the shape to which the methods apply. Methods may be defined independently of any object. For example, a method entitled ChangeCaptionFontSize may be defined to operate on any object having Caption and FontSize properties. ChangeCaptionFontSize, therefore, has the shape Caption, FontSize. The declaration may appear as:

```
Behavior for shape of Caption, FontSize
{
        ChangeCaptionFontSize (NewFontSize)
        {
                FontSize = NewFontSize
        }
}
```

The ChangeCaptionFontSize method could, therefore, operate on Button object 102 (FIG. 5) because Button object 102 has a shape that is convertible into, i.e., is a superset of, the shape of the ChangeCaptionFontSize method. In contrast to previous programming systems in which methods were defined as part of a class and were applicable only to objects of the defining class or objects derived from the defining class, the methods of the present invention operate on any object having the required properties, regardless of the derivation of the object.

Restrictions on Behavior

The present invention also allows restrictions on behavior. Such restrictions limit the objects to which the behavior applies. Behavior may be limited based upon, for example, the properties values or other aspects of an object. For example, methods DoubleFontSize and HalfFontSize could be defined to operate on objects having a shape FontSize and Visible, but only if the Visible property has a value of TRUE. The declaration would appear, for example, as:

```
Behavior for Shape of Font, Visible satisfying
Visible = TRUE
{
        DoubleFontSize ( )
        {
                Font = 2 * Font
        }
        HalfFontSize ( )
        {
                Font = Font / 2
        }
}
```

Tests to determine whether a property meets the restriction are applied when the method is called. The restrictions on the applicability of behavior can be applied to the object as a whole, rather than to the properties of the object. For example, a method may be defined to operate only on a specified object or only on an object that is contained in or derived from a specified object.

Implementing Behavior

Methods in the present invention can be organized globally or in association with objects. Either of these two techniques for organizing methods can be used with any of the three techniques described below for storing property values. If methods are organized globally, methods are stored independently of objects, for example, in a central methods table. When a method is called with an object as its argument, the system will compare the shape of the object with the shape of the method. If the shape of the object is the same as or convertible into the shape of the method, the method restrictions will then be checked with respect to the object being passed. If the restrictions are satisfied, the method will be executed on the object. Although methods are organized globally in this embodiment, the ability to include restrictions on methods allows the applicability of methods to be arbitrarily limited, for example, to particular objects or to objects in a particular container. Method execution is described in more detail below.

In embodiments in which methods are organized in association with objects, when behavior is declared, the shape of the new behavior is compared with the shapes of existing objects. References to the methods comprising the behavior are added to each existing object that has the shape of the method or a shape that is convertible into the shape of the method. Methods are thus associated with objects, and only methods associated with the object can act on the object. Either a copy of the method itself can be stored with each object or a reference to a single copy of the method can be stored. Because methods are checked for compatibility before being associated with each object, it is unnecessary to check for compatibility when a method is invoked. If the behavior declaration includes restrictions, it is still necessary to check whether the restrictions are satisfied because the restrictions can be based on parameters, such as property values, that can change during program execution. The ability to define methods independently from objects and to define restrictions on behaviors provides an advantage over prior art programming systems.

Share Tables

Besides maintaining property name table 108, a system of the present invention also maintains a shape table 134, shown conceptually in FIG. 8. Shape table 134 includes an indexed entry 136 for each of the different shapes of declared objects and methods.

Returning to FIG. 4, step 138 shows that when a new object is declared, the system compares the shape of the new object with existing shape entries 136 of shape table 134 to determine whether the shape of the new object matches an existing shape. If the shape of the new object does not match an existing shape, step 140 indicates that the new shape is added to shape table 134 and indexed with a corresponding new shape index value 142.

For example, Button object 102 of FIG. 5, which has a shape 152 shown in FIG. 8, is indexed as the first shape 136 in shape table 134. Properties 154 of shape 152 are arranged in canonical order, that is, in order of their indices in property name table 108, thereby eliminating the necessity of checking permutations of property names when searching the shape table for matching shapes. Maintaining shape table 134 using property index numbers 122 instead of property names and maintaining the property name table index numbers 122 in canonical order also greatly reduces the look-up time required in determining convertible shapes and mapping properties.

Figure 9:
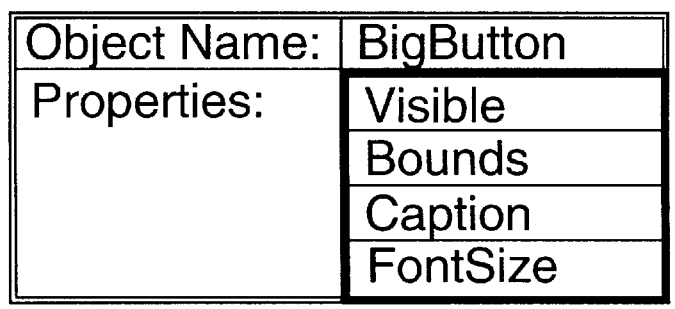
FIG. 9 is an example of another object, BigButton, of the present invention.
Figure 10:
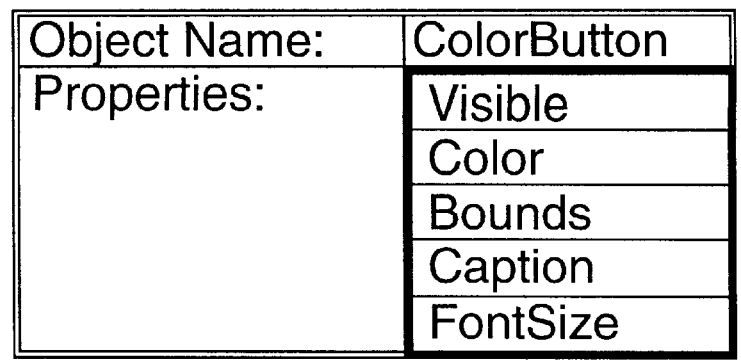
FIG. 10 is an example of another object, ColorButton, of the present invention.

Besides the property name table index number 122 corresponding to property name table 108, each property in a shape also has a within-object property number 156 corresponding to its position within the shape. If a second object, such as BigButton object 158 (FIG. 9), is defined to have the same properties as a first object, such as Button object 102, no additional entry would be created in shape table 134 because no new shape has been created. On the other hand, when a new object, such as ColorButton 160 (FIG. 10), is declared as having properties that define a unique shape 162 (FIG. 8), the system will determine that the new shape (Visible, Color, Bounds, Caption, and FontSize) does not correspond to any existing shape and will create and index a corresponding new entry 136 in shape table 134. Similarly, when behavior is declared as being applicable to a specified shape, the shape of the behavior is compared to existing shapes in shape table 134 and is added to shape table 134 if not already present. The term "within-object property number 156" is used generally to refer to any "within-shape" property order, including the "within-method" property order within a method.

After creating new shape entry 136, step 170 of FIG. 4 shows that the system compares the new shape with each of the existing shape entries 136 to determine whether the new shape is convertible to any of the existing shapes. The new shape is convertible to an existing shape if the properties of the new shape are a superset of the properties of the existing shape, i.e., if the new shape includes all of the properties of the old shape and at least one additional property. The existing shape is, therefore, a projection of the convertible new shape. The intersection of the set of properties of the existing shape and the set of properties of a convertible new shape is, therefore, the set of properties of the existing shape.

If the new shape is convertible to an existing shape, step 172 shows that a convertibility entry 174 is created in the shape table entry 136 for the new shape indicating the existing shape to which the new shape can be converted. If the new shape can be converted into more than one of the existing shapes, shape table entry 136 for the new shape will include a convertibility entry 174 for each existing shape to which the new shape can be converted. Step 176 shows that a map table 178 is created that shows which of the properties of the new shape correspond to each of the properties of the existing shape. Shape table 134 is shown without a right edge to indicate that the number of existing shapes to which the new shape is convertible is not arbitrarily limited and may increase as new shapes are defined.

For example, shape table 134 (FIG. 8) shows that shape four is a superset of shapes one and three and is, therefore, convertible into shapes one and three. Shape table 134 also includes, in some embodiments, map tables 178 indicating how to transform shape four into shape one or shape three. Methods that are defined to operate on shapes one and three could then operate on an object of shape four after the object is transformed in accordance with map tables 178. For example, the first property of shape four and of shape three is Visible, so the first property of shape four maps to the first property of shape three. The second property of shape three is FontSize, which is the fourth property of shape four, so the fourth property of shape four maps to the second property of shape three. The numbers used in map tables 178 are the within-object property numbers 156. Methods can, therefore, refer to properties internally by their within-shape property numbers, which is more efficient than referring internally to property names 124 or property name table index numbers 122.

After all the existing shapes to which the new shape can be converted are listed in new shape entry 136 of shape table 134 and the corresponding map tables 178 are created, step 188 shows that the system performs the reverse process, that is, it analyzes the existing shapes to see whether the new shape is a subset of any of the existing shapes. If so, step 190 shows that the new shape is added as a convertible entry 174 to the list of convertible shapes for the existing shape, and step 192 shows that a corresponding map table 178 is created. The existing shapes in shape table 134 are thus updated as each new shape is added.

Figure 11:
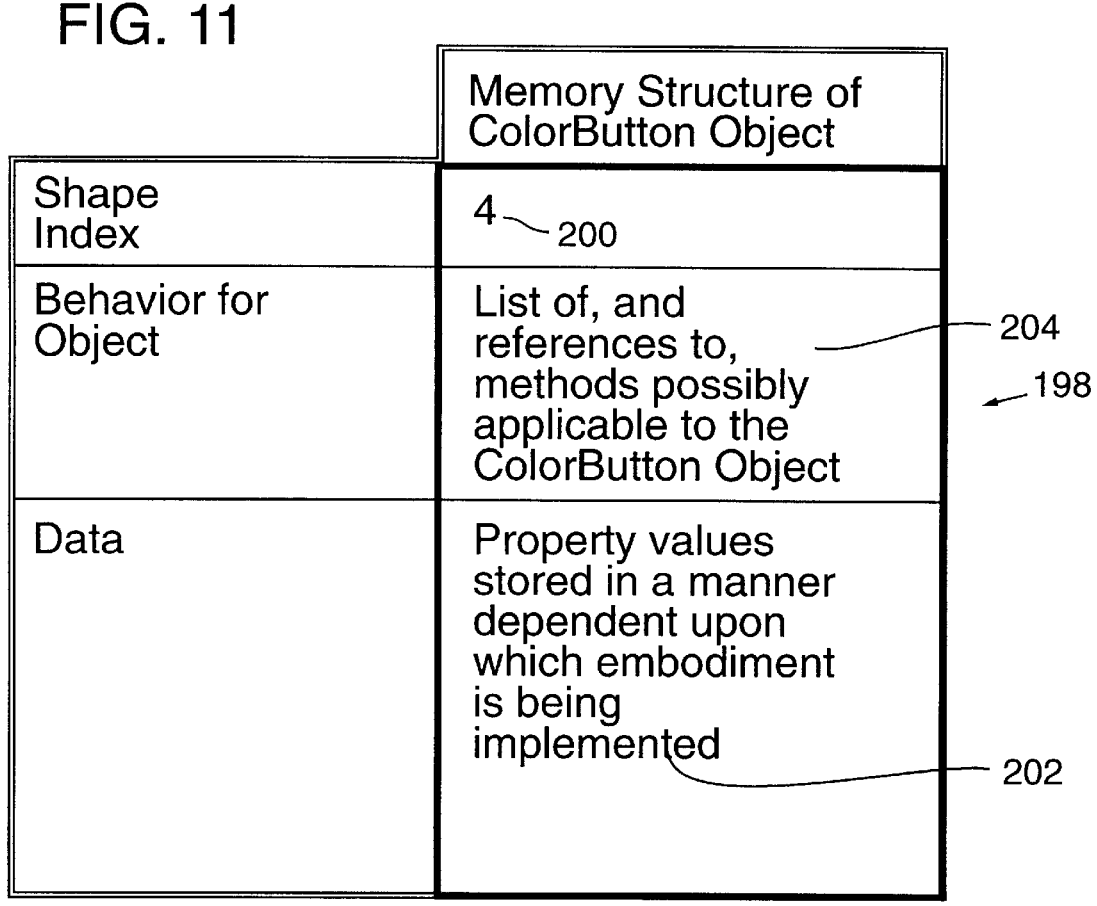
FIG. 11 shows a generalized object memory structure used in the preferred embodiments of the present invention.

Shape table 134 and property name table 108 provide structure for a programming application using the present invention. The tables do not, however, contain actual objects. An object of the invention is stored in memory as an object memory structure 198 as shown in FIG. 11. Object memory structure 198 consists of a shape index 200 and property values 202. The shape index is a reference to an indexed entry in shape table 134. In some embodiments, object memory structure 198 also includes behavior 204, which comprises references to the methods that are applicable to the object.

Data Organization, First Embodiment

Figure 12:
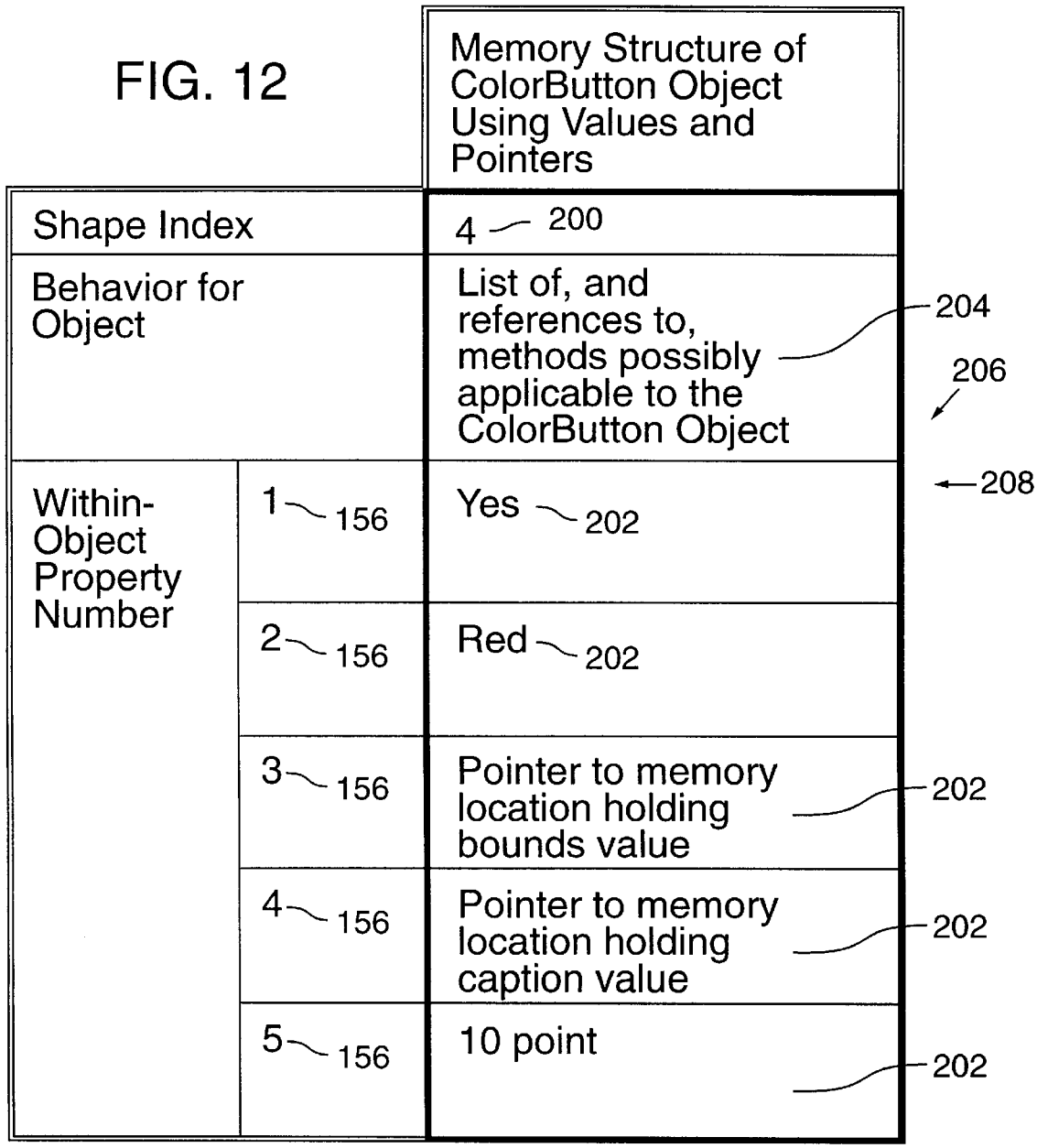
FIG. 12 shows a property value vector used in a first embodiment of the object memory structure shown in FIG. 11.

In a first embodiment, shown in FIG. 12, property values 202 are stored in an object memory structure 206 in ascending order of the property name table index number 122 of each property. Each property value 202 has the same length, typically 32 bits, and the property values 202 collectively constitute a property value vector 208. Shape table 134 lists the properties of the object (by property name table indices), and the data contained in property value vector 208 corresponds in order one-to-one with the listed properties of the object. Some or all of the property value 202 entries in property value vector 208 may be pointers to the values, rather than actual values.

Property value vector 208 allows the use of an index to access property values within object memory structure 206. Using an index has the advantages of being simple to implement and relatively fast for accessing values, but this technique requires that the data for each property be of equal, or at least predetermined, size so that the system can determine where in the object memory structure 198 the datum for each object begin.

Using pointers in place of actual data in property value vector 208 adds flexibility by allowing the actual data to be of different sizes and is used in inheritance as described below. In practice, object memory structure 206 contains primarily pointers, with actual data being stored typically for only short data types, such as small integers. A code in the memory location in the datum field can be used to indicate whether the datum in that field represents a value or a pointer. It is also possible to implement this embodiment using flags to indicate the beginning and end of the data field for each property.

Figure 13:
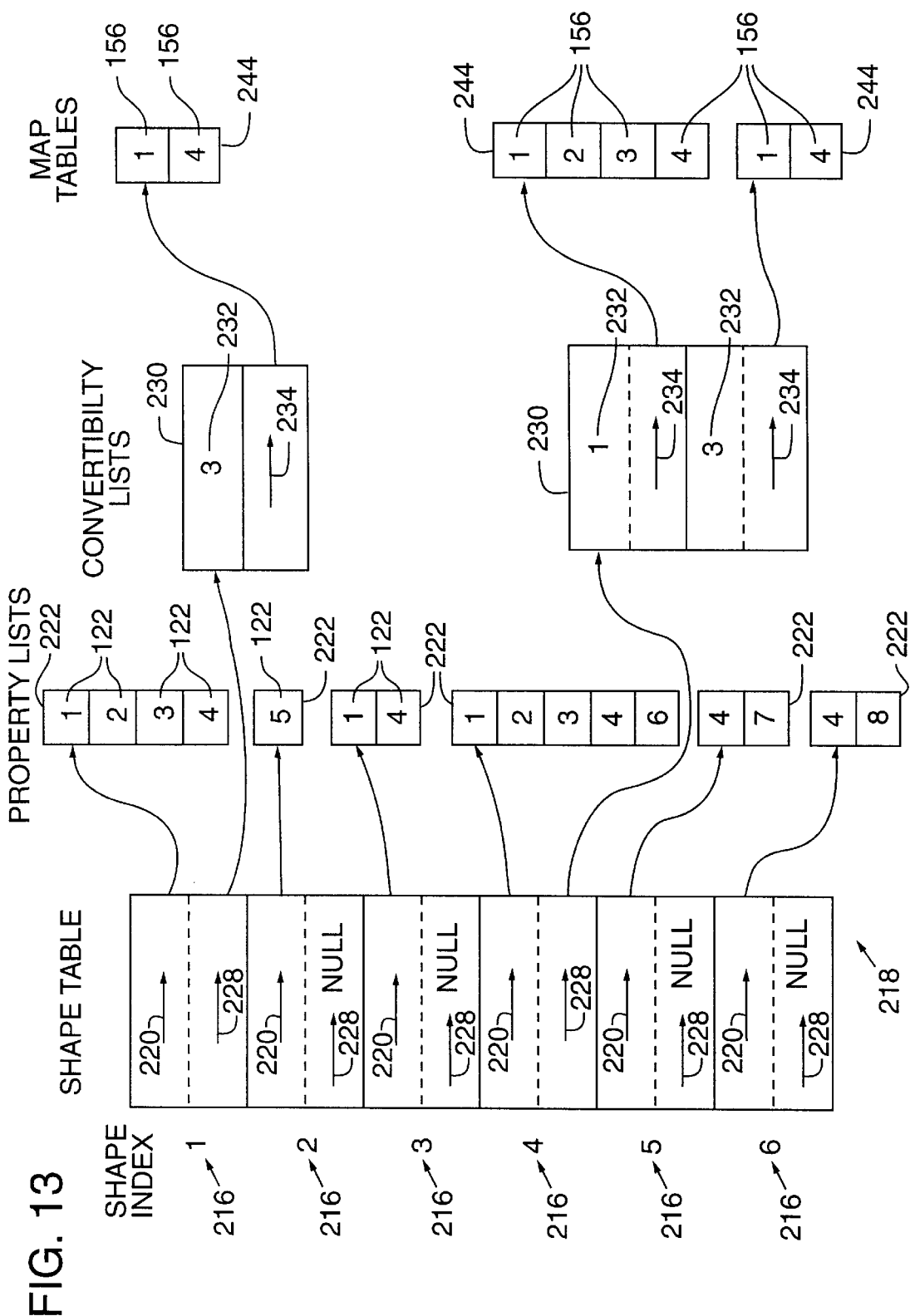
FIG. 13 shows a schematic of a preferred implementation of the shape table shown conceptually in FIG. 8.

FIG. 13 shows a schematic of a preferred implementation of a shape table 134 used in the first embodiment of the invention, which uses an object memory structure 206 including property value vector 208. Each indexed shape entry 216 in a shape table 218 includes two pointers: a first pointer 220 points to a property list 222 of properties and a second pointer 228 points to a convertibility list 230 of shapes to which the entry shape can be converted.

Each property list 222 includes the properties that define the shape. Property lists 222 use property name table index numbers 122 from property name table 108, rather than actual property names 124. As described above, property names are not typically used once the property name 124 has been entered in property name table 108 and a property name table index number 122 has been assigned. Property list 222 is in ascending order of the property name table index numbers 122, regardless of the order of the properties in the programmer's declaration of the corresponding object or method.

Each entry in convertibility list 230 of convertible shapes consists of a shape index number 232 and a pointer 234 to a map table 244. Map table 244 is a list of the within-object property numbers 156 of the shape entry 136 that corresponds to the properties of the shape to which shape entry 136 is being converted. The within-object property numbers 156 used in list 230 are the sequential numbers of properties in the shape entry, not the property name table index numbers from property name table 108.

Examining the first indexed entry 216 of shape table 218 as an example, FIG. 13 shows that pointer 220 in the first indexed entry 216 points to a list 222 including properties 1, 2, 3, and 4 (referring to properties Visible, Bounds, Caption, and FontSize, respectively, from property name table 108 (FIG. 7)). Pointer 228 points to a convertibility list 230 that has only one entry, 3, which refers to the third shape in shape table 218, and a pointer 234 to map table 244. Map table 244 includes the numbers 1 and 4, indicating that the first and fourth properties of shape one correspond to the first and second properties of shape three.

Continuing down the indexed entries 216 of shape table 218, shapes two and three also include pointers 220 to property lists, but because shapes two and three are not convertible into other shapes, pointers 228 to their convertible tables are set to NULL. Convertibility list 230 corresponding to shape four includes two entries. The first includes a shape 200 having a value of 1 and a pointer 234 to a corresponding map table 244 that includes within-object property numbers 1, 2, 3, and 4. The other entry includes shape index three and a pointer 234 to a corresponding map table 244 including within-object property numbers 1 and 4.

Data Organization, Second Embodiment

A second structure for storing and accessing property values of an object uses an object memory structure 246, exemplified in FIG. 14, having a property value storage area 248. In this embodiment, different property values 202 stored in property value storage area 248 can be of different lengths. Thus property values 202 do not constitute a vector as in the first embodiment and are not accessed by an index into property value storage area 248. Each named property, however, will have the same storage length in property value storage areas 248 of different objects.

Figure 15:
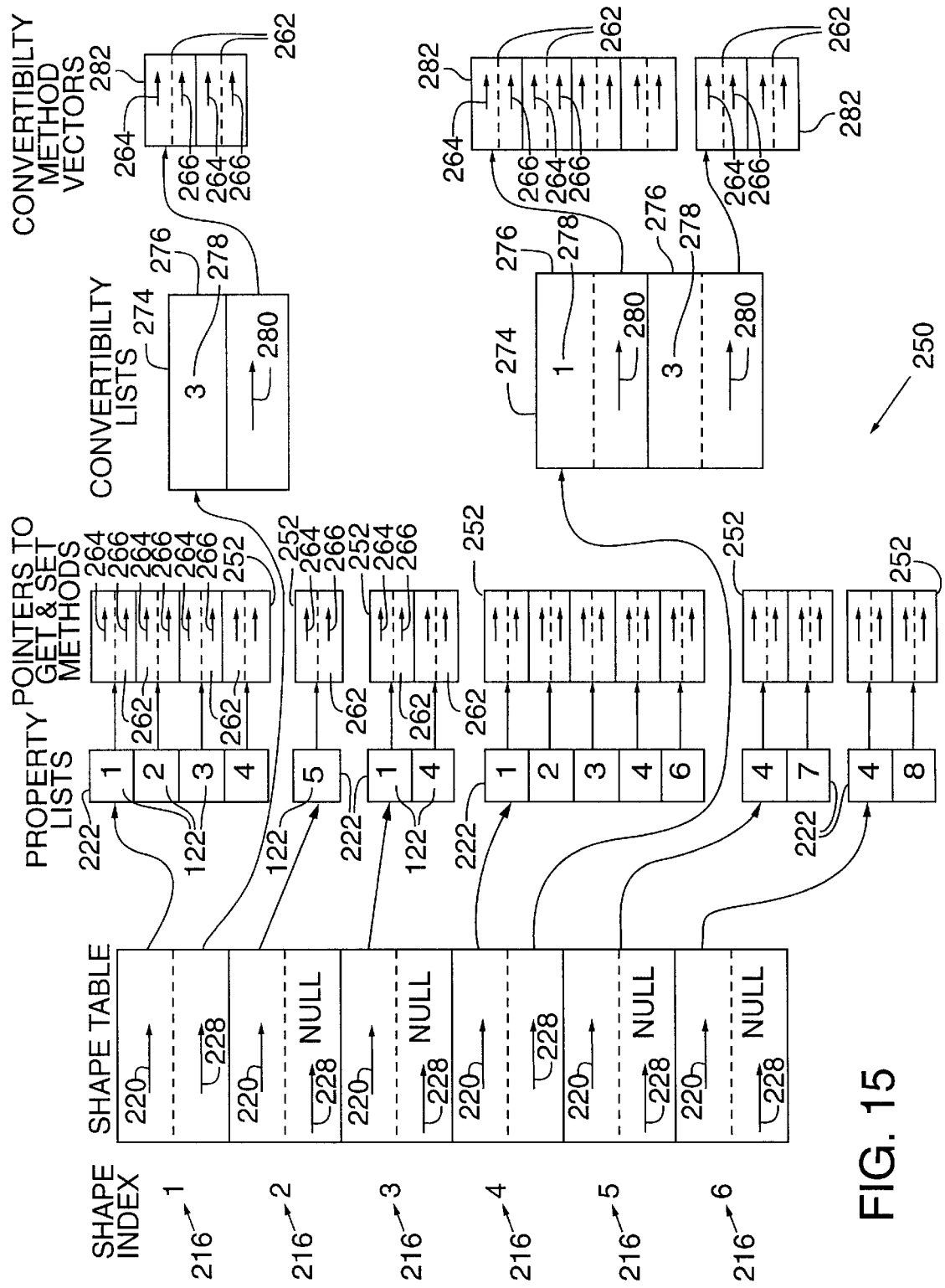
FIG. 15 shows a shape table used in the second embodiment of the present invention.

FIG. 15 shows a shape table 250 used in this embodiment. Shape table 250 is similar to shape table 218 shown in FIG. 13, but also includes for each different shape a method pointer vector 252, consisting of sets 262 of pointers. Each set 262 corresponds to a property in property list 222 of the shape and includes a pointer 264 to a method that gets the corresponding property value and a pointer 266 to a method that sets the value of the corresponding property of the object. Such methods are referred to herein as "get and set" methods. The get and set methods keep track of the exact location and size of the property values in object memory structure 246 for objects having the corresponding shape, thereby allowing use of property values of different sizes. Pointer sets 262 are stored in order of the property name table index numbers 122 of the properties upon which their methods operate, typically in ascending order of the property name table index numbers 122.

Pointer 228 of each entry 216 points to a convertibility list 274 having entries 276, each of which includes a shape reference 278 and a pointer to a conversion method vector 282. The conversion method vector 282 includes a subset of the pointer sets 262 in the corresponding method pointer vector 252, the subset corresponding to the properties contained in the shape to which the shape entry 216 is being converted.

For example, FIG. 15 shows that pointer 228 of the fourth shape entry 216 points to a conversion method vector 274 that has two entries 276, one corresponding to shape one and one corresponding to shape three. The property list 222 corresponding to shape three shows that shape three includes two properties, Visible (property name table index number 1) and FontSize (property name table index number 4). The corresponding conversion method vector 282, therefore, also has two entries, each comprising a set 262 of pointers 264 and 266. If, for example, a method having shape three is passed an object of shape four, the system would access the FontSize property of the object, which has a within-shape property number of two in the method shape, by using the second set 262 of pointers in the conversion method vector 282 that converts from shape four to shape three.

In this embodiment, there is one object memory structure 246 for each object and one table of get and set methods for each shape. This second embodiment is somewhat analogous to a virtual function table in C++, but with the methods for each shape are indexed by within-object property number 156 rather than by a virtual function number.

In one variation of this embodiment, the get and set methods could be combined into a single method and an additional argument could be passed to the method to indicate whether the property is to be set or retrieved. In yet another variation, the vector of pointers to get and set methods can be replaced with a pointer to a single get and set handler method that, when passed the object and the within-object property number, accesses the appropriate property value. In this case, the property value to be returned is determined within the get and set handler method, for example, by using a "switch" statement, rather than being determined before the method call and then calling the appropriate method.

In the two embodiments described above, property values are accessed by an index value into a vector, either of values or of methods. A third embodiment accesses property values using a run-time method table similar to those used in object-oriented languages such as Smalltalk. In this embodiment, all properties are treated as methods that set or return the property.

Data Organization, Third Embodiment

This third embodiment uses an object memory structure 288 as shown in FIG. 16. Each object memory structure 288 in this embodiment includes a shape index 200 indicating its shape with reference to a shape table, behavior 290, and property values 292. Behavior 290 comprises a searchable method table that includes references to methods that get and set each of the properties of the object, as well as references to other methods that operate on the object. This embodiment differs from the previously described ones in that the methods that get and set property values are associated with the object, rather than associated with the shape. That is, there is one set of get and set methods for each object, rather than one set for all objects having the same shape. The data within each object memory structure 288 is, therefore, not required to be in any particular order because the get and set methods can be different for different objects.

Figure 17:
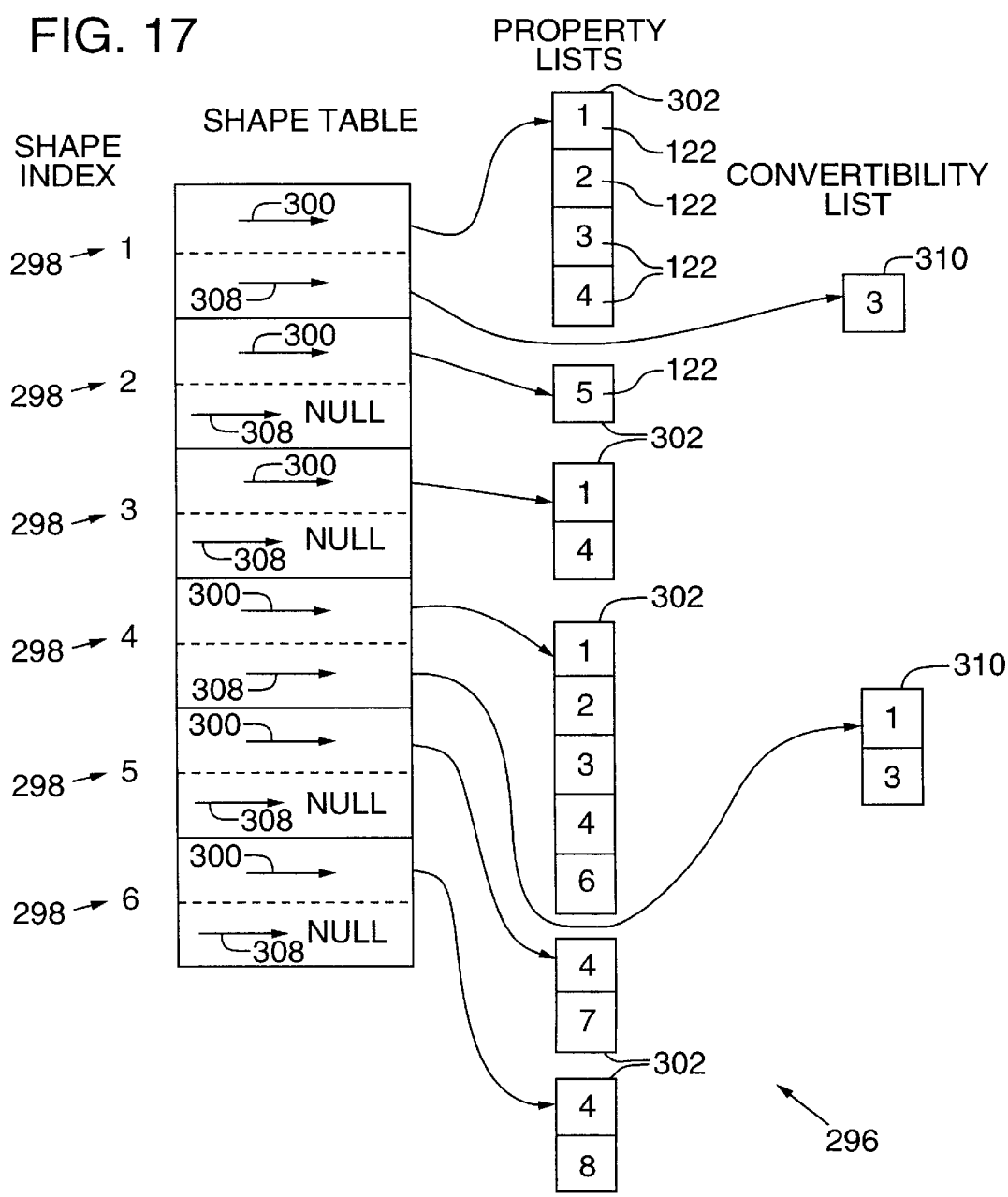
FIG. 17 shows a schematic representation of a preferred implementation of the shape table used in a third embodiment of the present invention.

FIG. 17 shows a simplified shape table 296 used in the third embodiment. Each shape entry 298 includes a pointer 300 to a property list 302 and a pointer 308 to a convertibility list 310. Convertibility list 310 comprises only a list of shapes to which the shape of the entry can be converted and does not include a pointer to a map table. Property list 302 includes property name table index numbers 122 that refer to property name table 108 (FIG. 7). It is not necessary to indicate how to convert between shapes. As will be described in more detail below, properties are accessed by method calls that refer to property name table index numbers 122, rather than to within-object property numbers 156.

Properties in shape table 296 are still maintained in canonical order using index values 122 from property name table 108 so that the entries in shape table 296 can be compared to the shape of newly declared objects, without concern for permutations of property order.

Creation and Execution of Methods

The details of method execution will vary depending upon which of the three data organization embodiments described above is used, as well as which of the two techniques is used for organizing methods, i.e., through a global method table or in association with objects. The execution of methods will be described with respect to an example method, DoubleFontSize, to illustrate the principles of the present invention.

Figure 18:
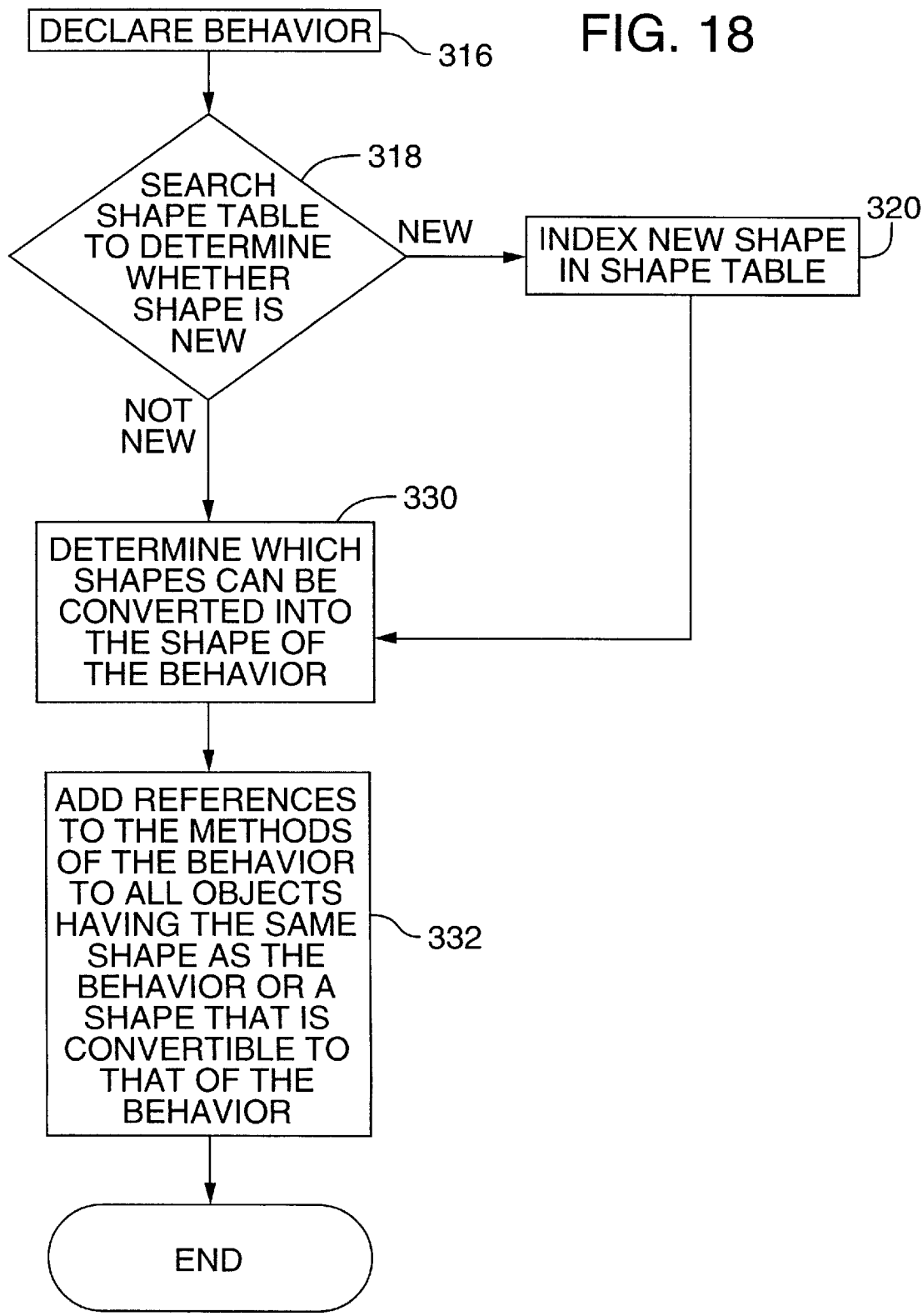
FIG. 18 is a flow chart showing the steps entailed in creating behavior in one embodiment of the present invention.

FIG. 18 shows the steps entailed in creating behavior in systems that use either of the first two data organization embodiments described above. Step 316 shows that first behavior is declared, for example:

---

Behavior for Shape (Visible, FontSize)
satisfying Visible = TRUE
    DoubleFontSize ( )
    {
        FontSize = 2 * FontSize
    }
End

---

Step 318 shows that shape table 134 (the form of the shape table will depend upon which of the embodiments described above is being implemented) is searched to determine whether the shape of the behavior is new. Step 320 shows that if the behavior does not correspond to one already in the shape table, the new shape is entered. In this example, the shape (Visible, FontSize) is already indexed in shape table 134 as shape number three.

Next, step 330 shows that the system determines from shape table 134 that shapes one and four are convertible to shape three. Step 332 shows that the system then finds all objects having shapes three, one, or four and adds a reference to the DoubleFontSize() method to the behavior list of each object. In an embodiment in which methods are not associated with objects, steps 330 and 332 are not performed. The newly declared method is instead added to a global method table.

Continuing with the above example, a ColorButton object may be declared as follows:

---

Object ColorButton
    HAS
        Visible    bool
        Bounds    RECT
        Caption    text
        FontSize    int
        Color    int
    END
END

---

Figure 19:
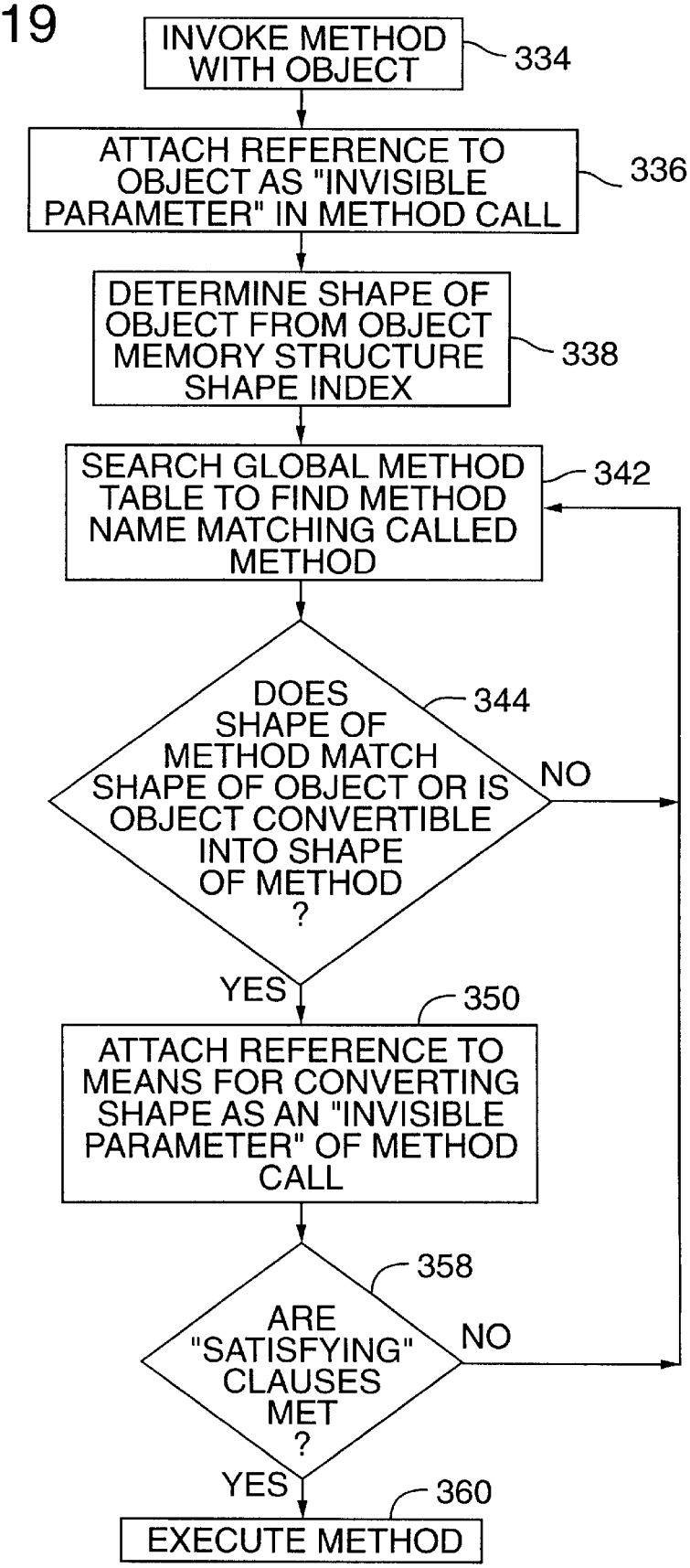
FIG. 19 is a flow chart showing the steps of a method call in an embodiment of the present invention using restrictions on the object sent to the method.

FIG. 19 is a flow chart illustrating the steps that take place in invoking a method on an object, such as ColorButton. Step 334 shows that the process begins when a method is invoked. For example, a method called DoubleFontSize could be called to operate on the object ColorButton by a line of code such as ColorButton.DoubleFontSize().

As shown in step 336, a compiler then typically converts the original method call to a modified method call to the DoubleFontSize method, the modified call having as an "invisible parameter" a reference to the ColorButton object and appearing, for example, as DoubleFontSize (ColorButton).

In an embodiment in which methods are not associated with objects, step 338 shows that the shape of the object upon which the method is invoked is determined from the object memory structure 198 (FIG. 11) of the object.

Step 342 shows that the global method table is searched to find a method having a method name that matches that of the invoked method. When a matching method name is located, step 344 shows that the shape of the object upon which the method is invoked is compared to the shape of the located method. If the shape of the object is the same as or convertible into the shape of the method, the process of executing the method will continue. Otherwise, step 342 is repeated, i.e., the global method table will be searched to locate another matching method name.

In an embodiment in which methods are associated with objects, a method call causes the method table associated with the object to be searched. All methods contained in the method table associated with the object have already been checked for compatibility with the object, so no additional shape check is required.

After locating in a method table a method having a method name matching the invoked method name and being compatible with the object upon which the method is invoked, step 350 indicates that a reference to a means for converting from the object shape to the method shape is attached as an invisible parameter to the method call.

A conversion means is required because, in the first two embodiments, the compiler has typically reduced references to property names 124 and property name table index numbers 122 in a method or object down to a within-object or within-shape property number 156. In the first embodiment for data organization described above, the means for converting between shapes is map table 244 (FIG. 13). In the second embodiment for data organization described above, the means for converting between shapes is conversion method vectors 282 (FIG. 15). If the shape of the method is the same as the shape of the object, an identity mapping is used. In the third embodiment for data organization described above, property values are referenced by a run-time look-up, rather than by a within-object property number, so no additional means is required to convert between shapes.

After a method of an appropriate shape is located, step 358 indicates that the object is tested for compliance with any "satisfying clauses," i.e., restrictions on the method. In the DoubleFontSize example, the value of the property Visible is checked to determine whether it is TRUE. The technique by which the value of a property is obtained is described below and will vary depending upon which data organization embodiment is used. If any restriction is not satisfied, step 342 is repeated and another method is sought. If restrictions are satisfied, step 360 indicates that the method is executed with the passed object.

Accessing Properties

During method execution, it is necessary to access values of properties of objects, either to retrieve or to set the value. The technique used to access property values will depend upon how the property values are stored.

In the DoubleFontSize method example above, method execution requires obtaining the value of the FontSize property, multiplying it by two, and then storing the result as the new value of the FontSize property. In the shape of the DoubleFontSize method, FontSize is the first property and Caption is the second property. When the DoubleFontSize method is compiled, the compiler will typically replace references to FontSize with a reference to Property 1 and references to Caption with a reference to Property 2. This substitution increases execution speed.

In the ColorButton object, however, the first and second properties are Visible and Bounds, and FontSize is the fourth property. During execution, the method uses the map table 244 or conversion method tables 282 to access the correct properties in the ColorButton object for use in the DoubleFontSize method.

First Embodiment

Figure 20:
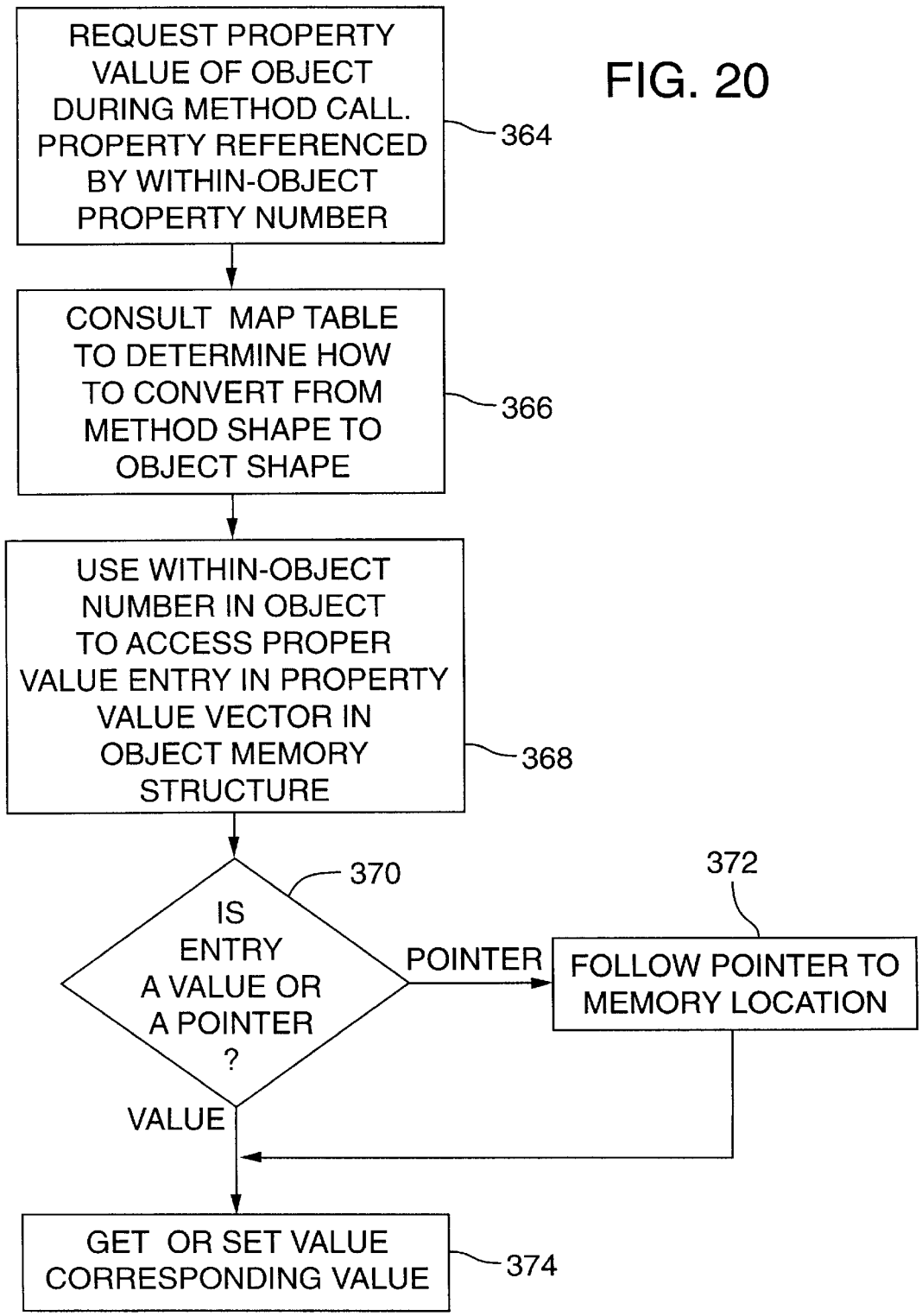
FIG. 20 is a flow chart showing the steps used to access property values in a first embodiment of the present invention.

In the first embodiment for data organization described above, which stores property values in property value vectors 208, the value of the FontSize property is accessed as shown by the flow chart of FIG. 20. Step 364 indicates that the process begins when the system requests the value of a property of an object that is passed to the method. Properties within objects are typically referred to by their within-object property number. As described above, a reference to the map table of the object, i.e., ColorButton, was included as an invisible parameter of the method call. Step 366 shows that the map table 244 of shape table 218 (FIG. 13) is consulted to determine how to convert from a ColorButton object of shape four into shape three. Map table 244 for converting from shape four to shape three comprises a list having as elements one and four, indicating that the first and second properties of shape four correspond to the first and fourth properties in an object of shape one.

The DoubleFontSize method, therefore, accesses the fourth property of the object ColorButton to obtain its FontSize property. Step 368 shows that fourth entry in property value vector 208 is retrieve. Step 370 shows that the retrieved datum is checked, for example by reading a flag bit, to determine whether the datum corresponds to a data value or to a pointer. Step 372 shows that, if the retrieved datum is a pointer, the pointer is followed to retrieve the actual datum value of FontSize. Step 374 shows that the property value is retrieved or set.

Execution of the DoubleFontSize method continues with multiplying the retrieved value of FontSize by two. The result is then stored as the new value of the FontSize property in the Button object. Storing a property value entails accessing map table 244 to determine the within-object property number of the property value to be stored and either writing the new value to the correct location or writing a pointer to the new value to the correct location.

If the shape of the method is identical to the shape of the object, no conversion is required and an identity map table is used.

Second Embodiment

Figure 21:
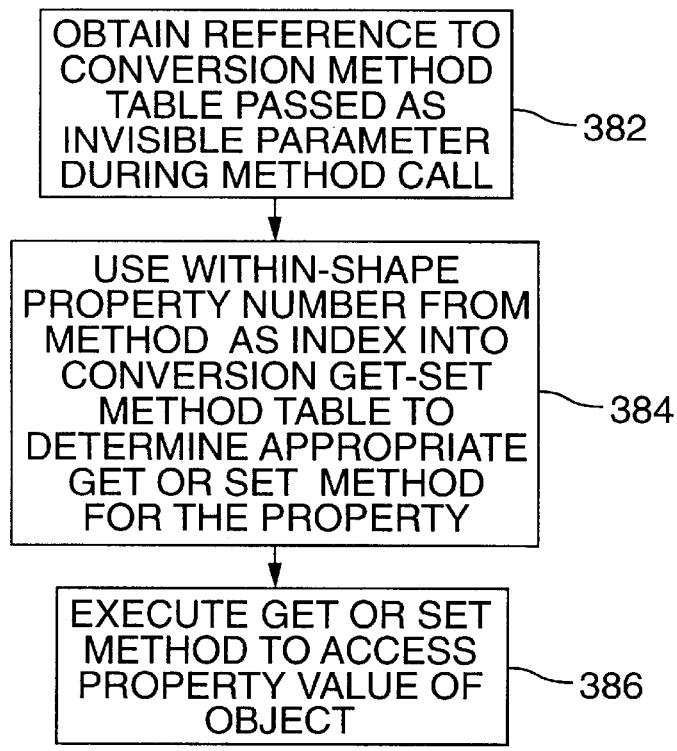
FIG. 21 is a flow chart showing the steps used to access property values in a second embodiment of the present invention.

FIG. 21 is a flow chart showing the steps used to access properties in the second embodiment for data organization, in which references to get and set methods are associated with each property in shape table 250 (FIG. 15). As described previously, a method call in this embodiment includes two invisible parameters: a SELF reference to the object being passed and a reference to a means for converting between the shape of the object and the shape of the method. In this embodiment, the means for converting is the corresponding conversion method vector 282 for converting from the shape of the object to the shape of the method. The entries in conversion method vector 282 are pointers to the get and set methods for each property of a first shape listed in the order of the properties of a second shape.

Step 382 shows that a reference to the corresponding conversion method vector 282 is obtained from the function call. Step 384 shows that the within-shape property number 156 (FIG. 8) from the method is used as an index into the conversion method vector 282 to determine the appropriate set 262 of pointers 264 and 266 to methods for accessing the property values in object memory structure 246. Step 386 shows that the appropriate method to get or set the property value is executed.

For example, in conversion method vector 282 for converting from shape one to shape three, the entries comprise pointers to get and set handlers for the Visible property of a shape one object followed by pointers to get and set handlers for the FontSize property of a shape one object. The FontSize property of ColorButton is accessed, therefore, using the pointers to the second set of get and set handlers in the conversion method vector 282, thereby converting from shape one to shape three. The get and set methods are passed another invisible parameter, a SELF reference, that identifies the ColorButton object and that indicates that the property values of that particular object are being accessed.

If an object upon which a method operates has the same shape as the method, the property values are accessed by using method pointer vector 252 instead of a conversion method vector 282.

Third Embodiment

If the third embodiment for organizing data as described above is used, the steps used to execute a method are similar to those shown in FIG. 19, but there are some differences. When a method is compiled in this embodiment, property names 124 are reduced to property name table index numbers 122, but not to within-object property numbers. Thus neither map table 244 nor conversion method table 356 are required and, therefore, they are not included in shape table 296 (FIG. 17).

During method execution, a property such as the FontSize property of the ColorButton object is referred to by its property name table index number. To access the value of the FontSize property of the ColorButton object, the Double-FontSize method calls a method named FontSize. Because the DoubleFontSize method is operating on the object ColorButton, a SELF reference to ColorButton is included as an invisible parameter with the call to FontSize. The call to FontSize also includes a flag to indicate whether the property value of FontSize is to be set or retrieved.

In this embodiment, the behavior 204 for each object includes a method having the name of each property, the method being the access to get or set the property value. A reference to a property of an object is treated as a method call to the object. The method name indicates the property that is to be accessed, and the method call includes a SELF reference to identify the applicable object and a flag indicating whether the value is to be set or retrieved.

The method table that comprises the behavior of the object is then searched, and the appropriate method is executed to retrieve or set the property value. As in the second embodiment described above, get and set methods keep track of the exact location and size of the property values. In this embodiment, however, each object has its own get and set methods, rather than each shape having get and set methods. Because the methods are unique for each object, the memory storage of property values within objects of the same shape can be different. Moreover, because the method table is searched to find the get and set methods, as opposed to being indexed, the methods listed in the table do not need to be in any particular order.

Figure 22:
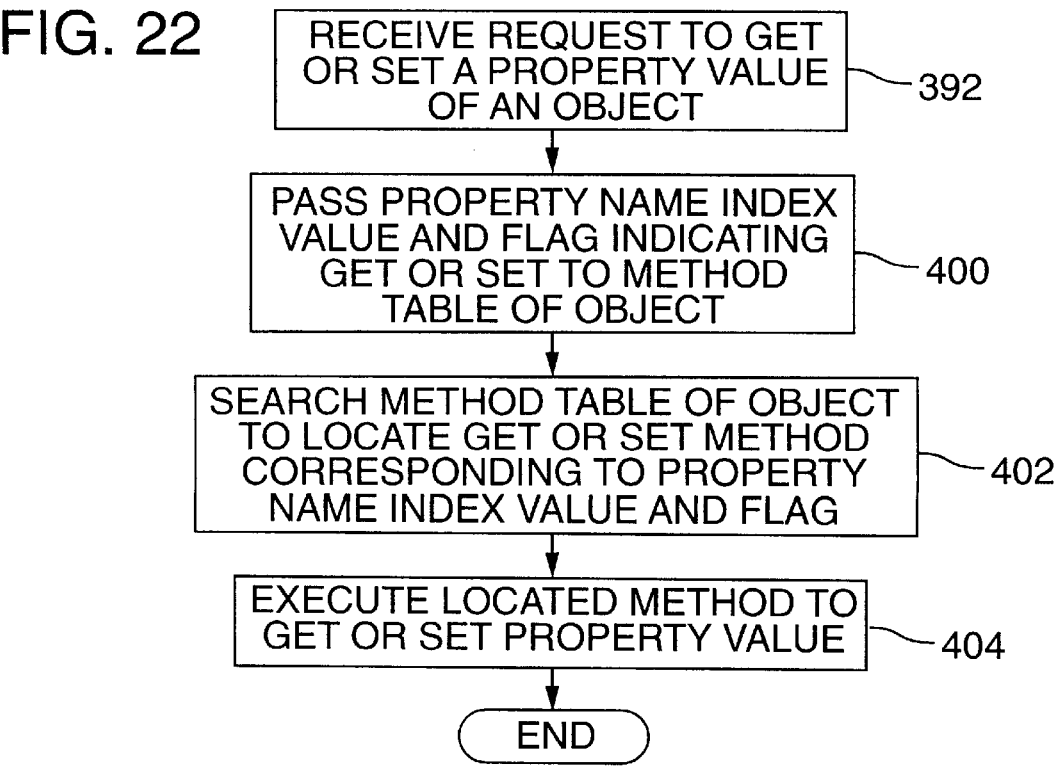
FIG. 22 is a flow chart showing the steps used to access property values in a third embodiment of the present invention.

FIG. 22 is a flow chart illustrating the steps involved in accessing property values during execution of a method. The process begins with step 392 when a property value is requested. Step 400 shows that the property name table index number of the requested property, along with a flag indicating whether the property is to be retrieved or set, is passed to the method table of the object indicated by the SELF invisible parameter of the original method call. Step 402 indicates that the method table is searched to find the method corresponding to the indicated property name table index number and the get or set flag. Step 404 indicates that the appropriate get or set method is executed to return or set the property value.

The steps in FIG. 22 show that it is not necessary to access a shape table when performing a simple get or set of a property. A shape table is still required, however, to indicate which shapes can be converted to other shapes.

In the first two embodiments for data organization described above, it is desirable for the compiler to convert all references to properties in methods or objects from property name table index numbers 122 (FIG. 8) to within-object property numbers 156 to decrease the time required to access those properties during program execution. When a method is passed a single object, it is possible for the compiler, using the techniques described above, to convert references to property values using property name table index numbers 122 to within-object property numbers 156 of the object acted upon. A SELF reference to the object and to map table 244 or method conversion table 282 was obtained upon entry into the method, so these parameters were available for reducing property names coded in the method to within-object property numbers of the object sent to the method.

At times, however, it is necessary to obtain values of properties of objects other than those upon which the method is invoked. In such cases, the compiler will still attempt to reduce property names to within-object property numbers. Because the property value being accessed is not of the SELF object upon which the method is invoked, a pointer to the corresponding conversion means will not be passed with the method call. The compiler will need, therefore, to determine what object that owns the property value being accessed, obtain the shape of the object, and locate the corresponding conversion means in the shape table. The compiler can then use the conversion means to convert the property in the method to a within-object property number for the object that owns the property.

In some cases, the shape of the object that owns the property may not be known to the compiler. In such a case, the property name 124 is reduced to its property name table index number 122, but cannot be reduced further to a within-object property number. The property name table index number 122 is then used to reference the property value at run-time, when the shape of the object can be determined. In the first two embodiments for data organization, property list 222 (FIGS. 13, 15 ) is searched to determine the within-object property number, which is used to index into either a property value vector 208 or a method pointer vector 252 to obtain the property value.

Separation of Object Description from Object Storage

The use of shapes and the techniques of storing property values of the present invention result in a more flexible programming environment than exists in prior art object-oriented languages such as C++, in which the data associated with an object are stored in the order in which the properties are declared or inherited, as shown in FIG. 1.

It will be understood that while the structure and content of shape table 134 will vary in different implementations of the invention, some mechanism will be provided to convert from a first shape having a first set of properties to a second shape having a superset of the first set of properties. Moreover, property names will, in each of the embodiments described, be unique within an application and will be ordered by a property name table. Such an arrangement permits methods and objects to refer to properties by an internal index number, i.e., the within-object or within-method property number, thereby improving efficiency and facilitating the implementation of objects and behavior in a system including multiple objects and methods.

The rigid memory structure of the prior art necessitates that all properties and methods of a parent be inherited by a child object, which leads to the problems with multiple inheritance described above in the Background of the Invention section. The unique architecture of the present invention allows the actual memory structure of an object to be divorced from the programmer's representation of the object. This separation provides flexibility to a compiler in allocating memory and frees the compiler to perform optimizations that were heretofore impractical. For example, the compiler can share memory structures among different objects, such as a parent and child objects. The separation of structure and representation also allows more flexibility in defining inheritance.

Facet™-type Subgroup Inheritance

A set of properties within an object can be grouped together and treated as a specific aspect of the object. Such an aspect will be referred to as a Facet™-type property subgroup. A programmer can control by declaration and by object placement which Facet™-type property subgroups of an object are inherited from which parent objects. Parent objects can also be divided into Facet™-type property subgroups from which corresponding Facet™-type property subgroups of child objects are inherited. Inheritance through Facet™-type property subgroups can be implemented in a has-a hierarchy or an is-a hierarchy. In a has-a hierarchy, properties are inherited from corresponding Facet™-type property subgroups of whatever parent containers a child object is placed in. In an is-a hierarchy, properties are inherited from Facet™-type property subgroups of a specified parents. A has-a hierarchy is more suitable to an architecture based on an object prototype model, whereas an is-a inheritance hierarchy is more suited to a class instance model.

Through the use of Facet™-type property subgroups, the invention allows a single object to be contained in (has-a) or derived from (is-a) multiple parent objects and allows a programmer to specify by declaration which Facet™-type property subgroups of a child object will be inherited from each of the parent objects, thereby greatly increasing the granularity and flexibility of inheritance. Each Facet™-type property subgroup has one parent, and individual properties within a Facet™-type property subgroup of the child object can be specified as inherited from the parent or not inherited. An object, therefore, can be declared to inherit just the required properties from the relevant parent. In effect, the present invention converts multiple inheritance into multiple single inheritances, thereby eliminating the conflicts inherent in prior art multiple inheritance schemes.

Although the description below describes an implementation of Facet™-type property subgroups using a has-a hierarchy, one skilled in the art would be able to implement the invention using an is-a hierarchy in a similar manner.

Figure 23:
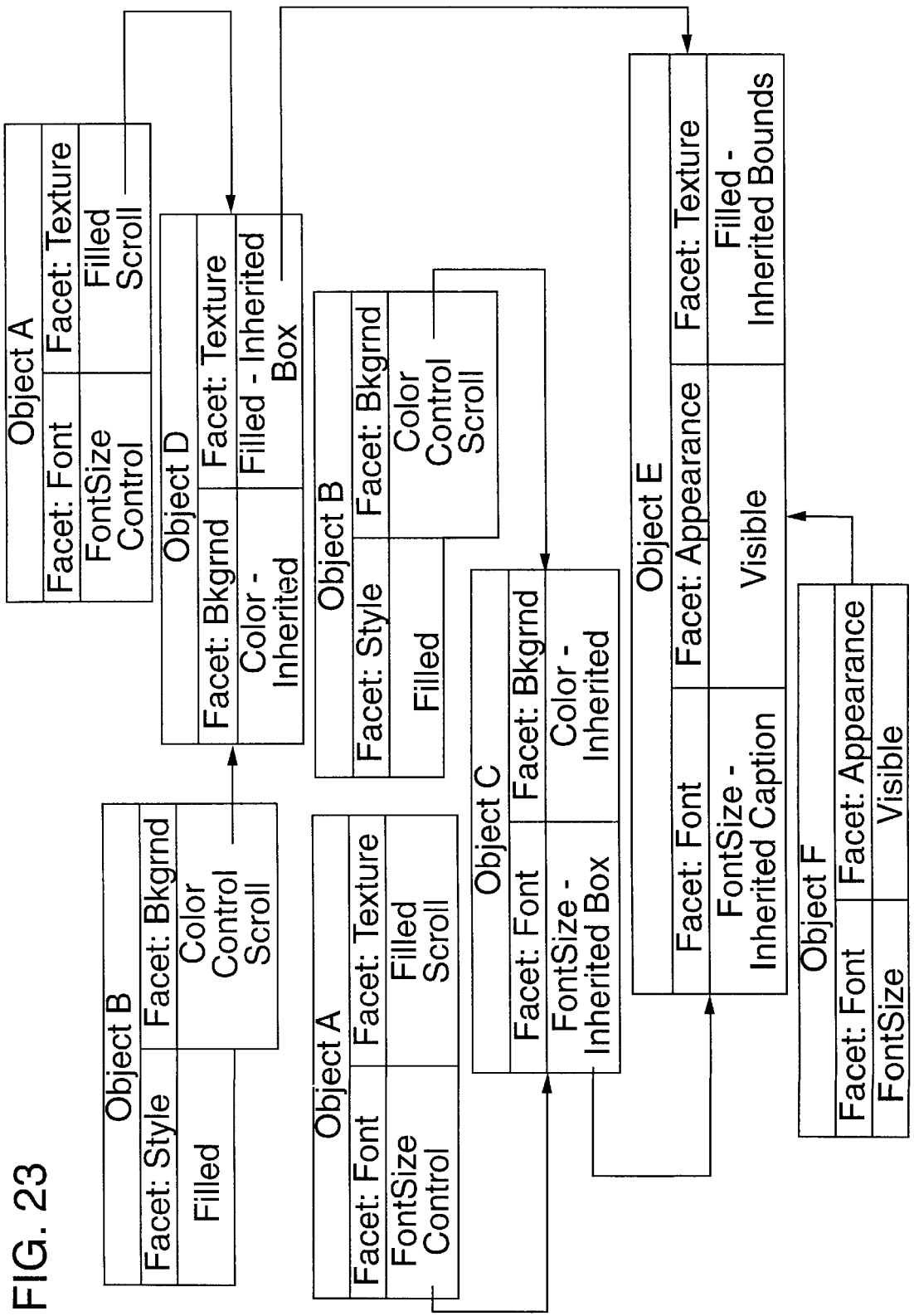
FIG. 23 is a diagram showing inheritance under the present invention from objects analogous to those shown in FIG. 3.

Below is an example of object declarations for objects A through F that appear in a has-a inheritance hierarchy as shown in FIG. 23.

```
Object A
{
        Facet Font
                Property FontSize
                Property Control Component
        Facet Texture
                Property Filled
                Property Scroll Component
}
Object B
{
        Facet Style
                Property Filled
        Facet Bkgrnd
                Property Color
                Property Control Component
                Property Scroll Component
}
Object C
{
        Facet Font
                Property FontSize Inherited
                Property Box Component
        Facet Bkgrnd
                Property Color Inherited
}
Object D
{
        Facet Bkgrnd
                Property Color Inherited
        Facet Texture
                Property Filled Inherited
                Property Box Component
}
Object E
{
        Facet Font
                Property FontSize Inherited
                Property Caption
                Method 1
        Facet Appearance
                Property Visible
        Facet Texture
                Property Filled Inherited
                Property Bounds
                Method 2
}
Object F
{
        Facet Font
                Property FontSize
        Facet Appearance
                Property Visible
}
```

Figure 2C:
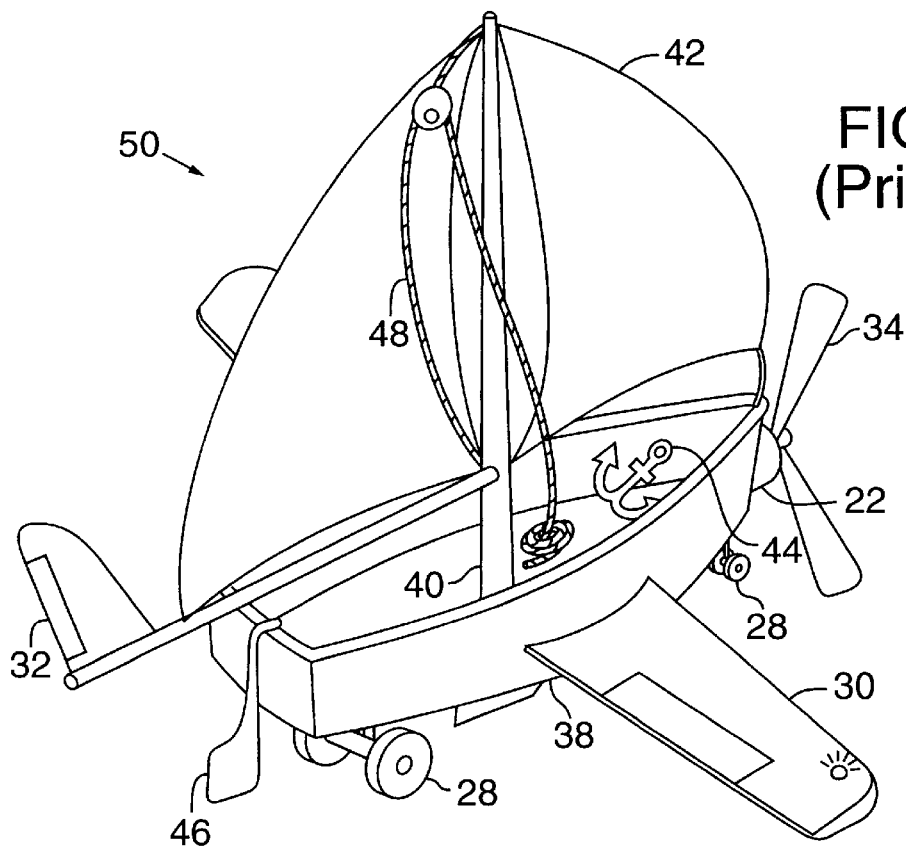
FIGS. 2C and 2 D are pictures of the seaplane object of FIG. 1C resulting from prior art multiple inheritance, FIG. 2C showing inheritance first from the boat object and FIG. 2D showing inheritance first from the plane object.
Figure 2B:
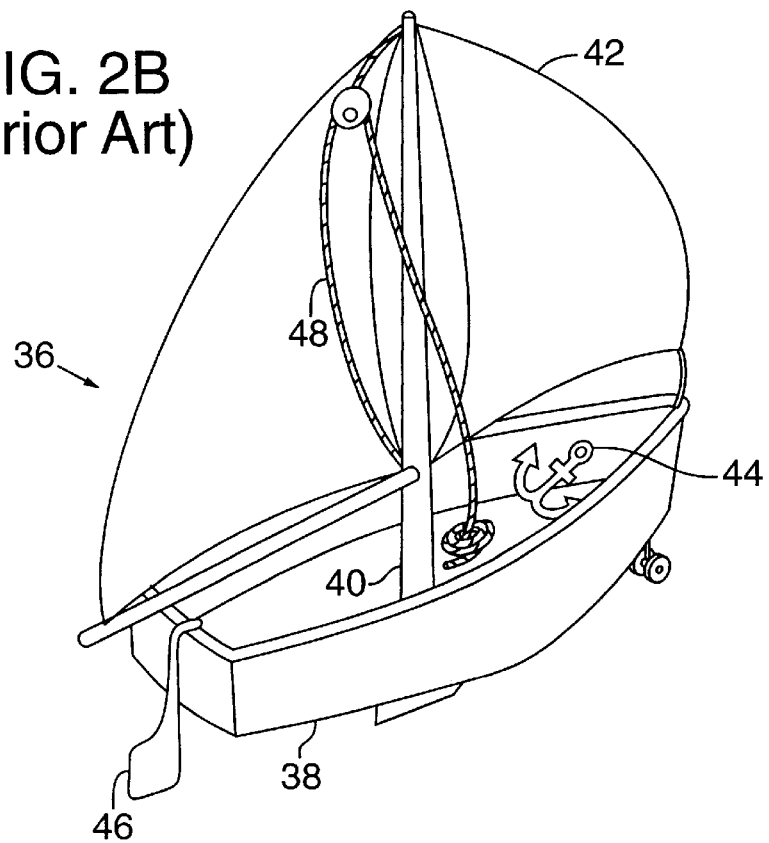
FIGS. 2A and 2B are pictures of a plane and a boat represented by the objects of FIGS. 1A and 1B.
Figure 2D:
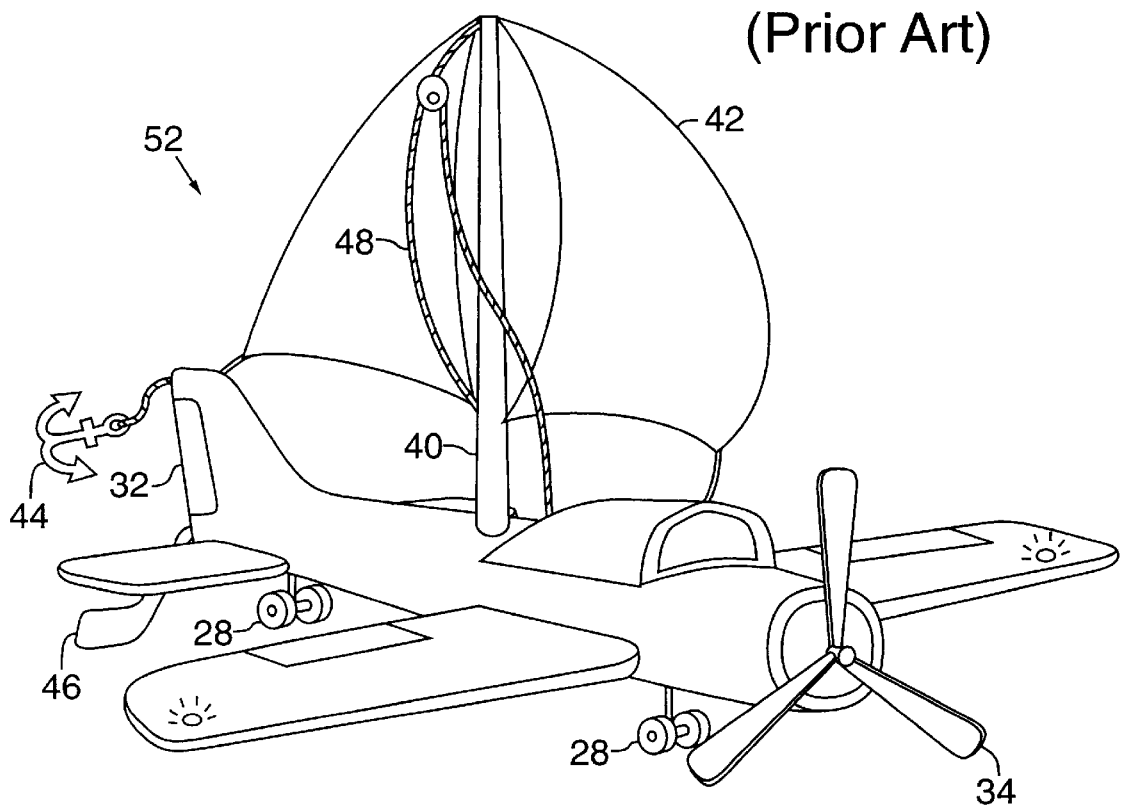
Figure 2A:
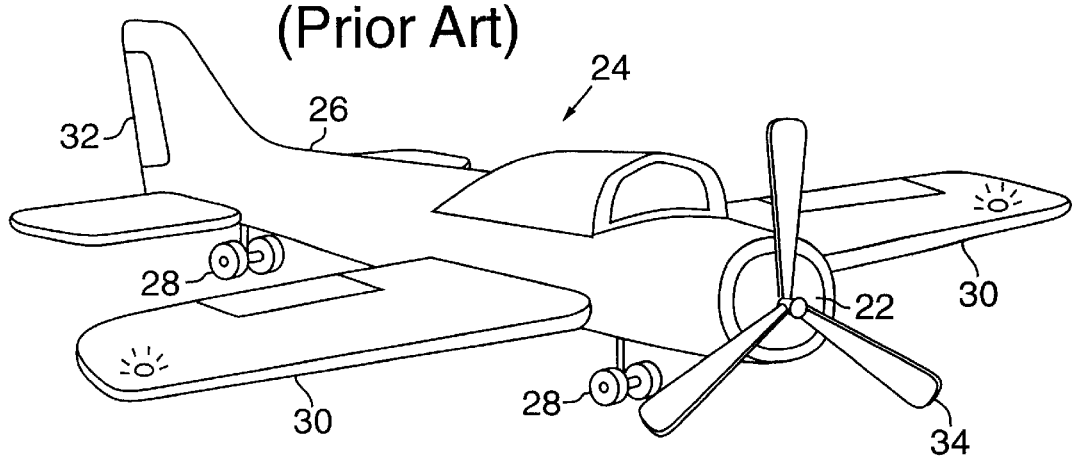
Figure 3:
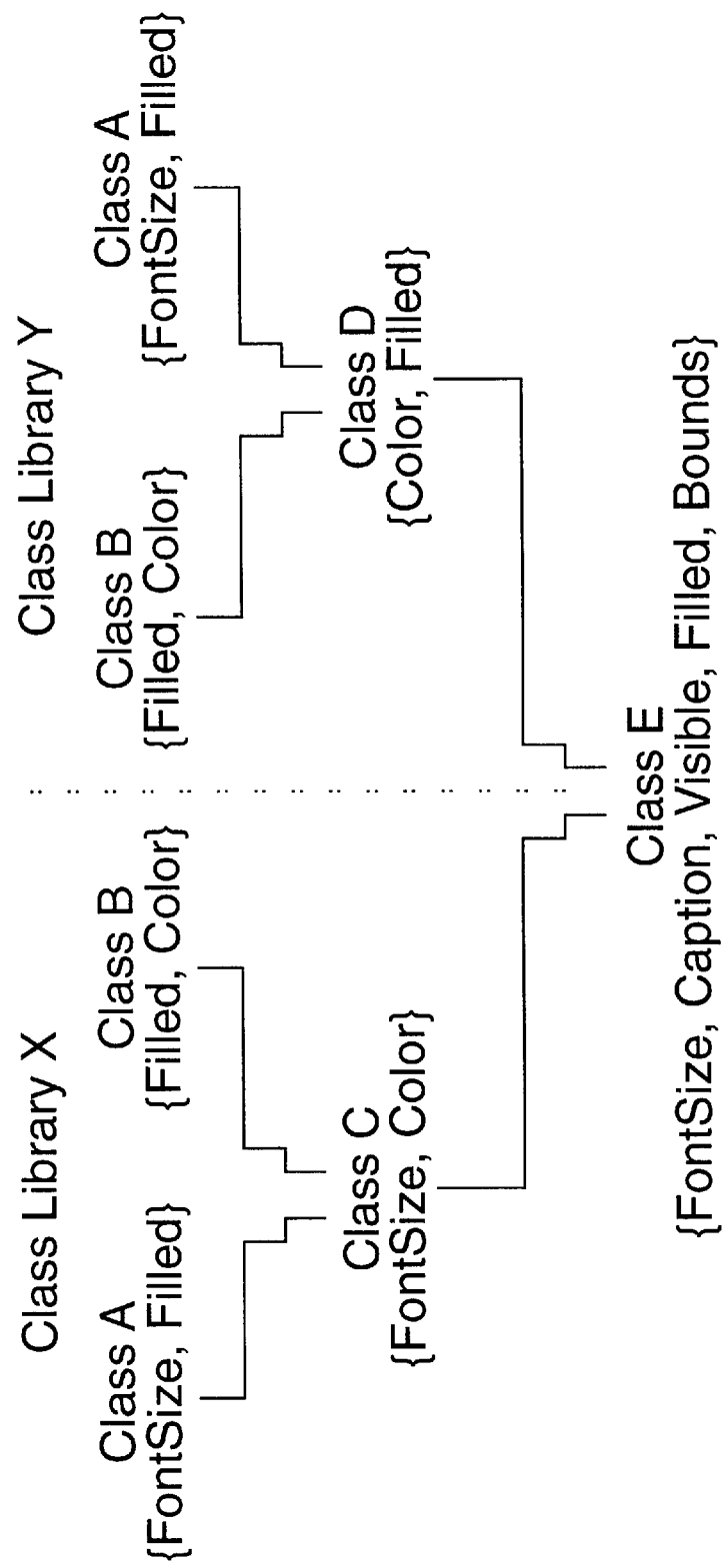
FIG. 3 is a chart showing a prior art multiple inheritance hierarchy.

The objects in FIG. 23 are analogous to those of FIG. 3, which describes prior art multiple inheritance. In the present invention, however, it is possible to specify the parent from which properties within a Facet™-type property subgroup are inherited, and it is possible to specify which properties will be inherited and which will not be.

In the example of FIG. 3, both objects A and B include a property named Filled. In prior art programming systems, object E ultimately inherited both Filled properties, and it was difficult to determine which, if either, Filled property would be accessed when requesting the Filled property of E. If a method defined in object C depended upon having a specific Filled property from either object A or B, it was uncertain whether the method would work on object E, even though object E had inherited the method from object C.

These problems are solved by the present invention. FIG. 23 and the corresponding declarations above show that objects A through F are each divided into Facet™-type property subgroups, each Facet™-type property subgroup being declared as containing specific properties.

A property that is itself part of an inheritance hierarchy, such as the Control property of object A, is tagged as a "component" object. When a property is tagged as a component, the object assigned to that property can participate in the inheritance hierarchy, i.e., the assigned object can have properties that inherit values from the parent container. For example, object C may represent a button object. When it is placed in object A, such as by an assignment statement like A.Control=C, the "gateway" opens for the value of properties, such as FontSize, in the Font facet of object A to flow to the same properties in the Font facet of object C. Although the description in object A of the property Control as a component opens the gateway for inheritance, whether or not specific properties are inherited is controlled by declaration in the child object. The tag "inherited" on the FontSize property of object C indicates that the FontSize property value will be inherited from the property of the same name in the corresponding facet of the container parent. Any object having a Font facet could be placed as the Control component in object A. Thus, in a preferred implementation, if a property exists in a facet of the child object, and the child object is placed in a component slot in a parent object facet having the same name as the child object facet and containing the same property, the property in the child object will inherit the value of the property in the parent object, if the property in the child is tagged "inherited."

For example, in the declarations above and FIG. 23, object C is contained within both object A and object B. Object C could be, for example, a newsletter story, and objects A and B could be a page and a column of the newsletter or even the newsletter itself. The FontSize property of the Font facet of object C is tagged as inherited. Object C is contained in the Font facet of object A. The FontSize property of object C will therefore be inherited from object A. Object C is also contained in the Bkgrnd facet of object B. The property Color, which is in the Bkgrnd facet of object C and is tagged for inheritance, is, therefore, inherited from object B.

Similarly, object D is contained in both objects A and B. Object D inherits its properties Color and Filled from objects B and A, respectively, and passes its property Filled in its Texture facet on to the texture facet of object E. The property Visible in the Appearance facet of object E inherits its value from object F through an is-a inheritance because object F is specified as the parent of the facet Appearance of object E.

Thus, inheritance is determined by the explicit declarations of Facet™-type property subgroups in the object definitions, rather than by the order of inheritance and arbitration rules that exist outside of the object. Whether object E inherits property Filled from object C or object D is determined within object E and its immediate parent, not by a set of external rules. A programmer can know that an object E that is placed in an object C will inherit the FontSize property from object C merely by looking at the declarations of objects E and C. Methods of object C, which were dependent upon inheriting the property FontSize from object A and the property Color from object B, will function properly because the inheritance is specified by declaration. Essentially, the invention reduces multiple inheritance to multiple cases of single inheritance, each case being described as a Facet™-type property subgroup.

Figure 24A:
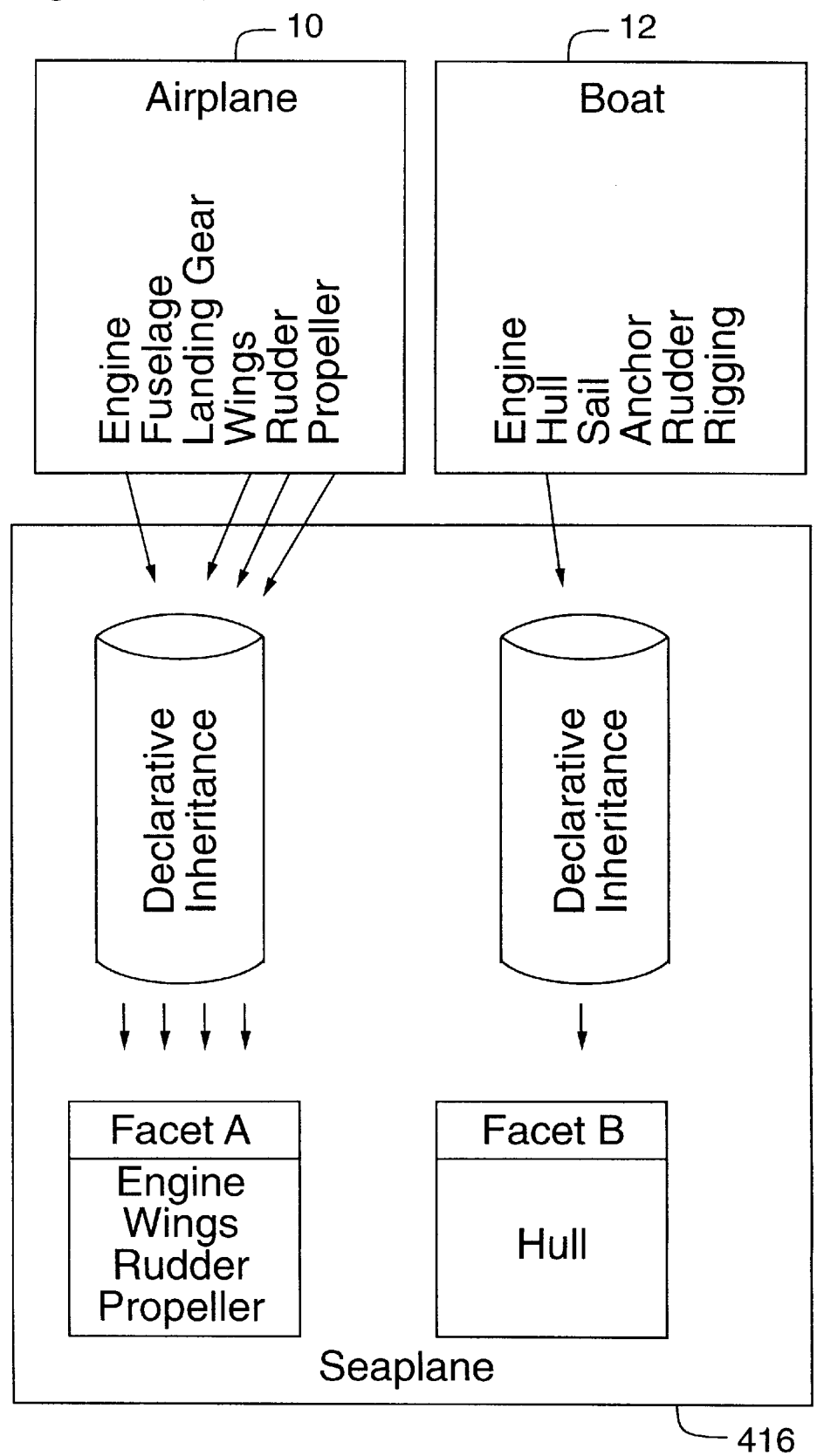
FIG. 24 is a conceptual comparison of the selective inheritance of the present invention with the inheritance of prior art language systems.
Figure 24B:
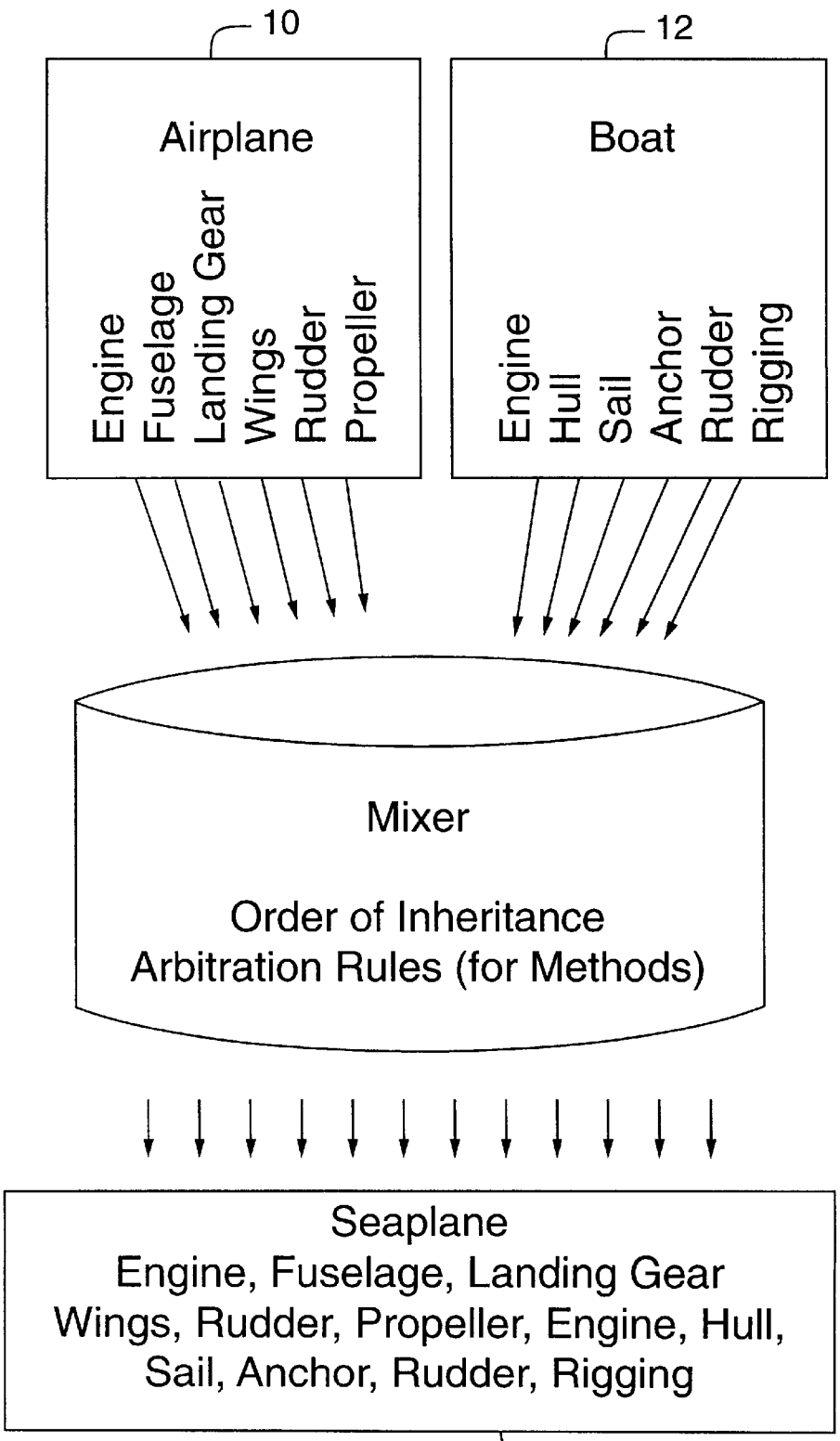

FIGS. 24A and 24B use the seaplane example of FIGS. 1 and 2 to contrast the selective inheritance of the present invention (FIG. 24A) with non-selective, prior art inheritance (FIG. 24B). FIGS. 24A and 24B respectively shows Seaplane object 416 and Seaplane object 418 having parent objects Airplane 10 and Boat 12. FIG. 24A shows that Seaplane object 416 can specify within itself by declaration which Facet™-type property subgroups will be inherited from which of its parent objects. FIG. 24A also shows that if a property, such as landing gear is not required in the child, it is simply not inherited. Thus, although a parent container makes all of its properties available to child objects for inheritance, it is the child object that acts as a "gatekeeper" and determines by its declaration what information from the parent will flow down to the child object. FIG. 24B shows that in the prior art, all properties of the parents are inherited and conflicts between methods are resolved by rules outside of the Seaplane object and related to the order of inheritance. FIG. 24A shows that, in the present invention, the inheritance is controlled within Seaplane object 416. It will be understood that some of the properties of an object will themselves be objects that contain other objects and some of the properties of an object will be simple attributes of the object.

In the first embodiment for data organization described above, which uses object memory structure 206 as shown in FIG. 12, property values were stored in a property value vector 208 as part of the object. Properties could be stored either as actual values or as pointers to values. To inherit a property value using this storage technique, object memory structure 206 of the child object contains a pointer to the value stored in object memory structure 206 of the parent object. In such an embodiment, the user of an application can overrule an inherited value by replacing the pointer to the parent object property 208 with an actual value or with a pointer to a new value.

Figure 25:
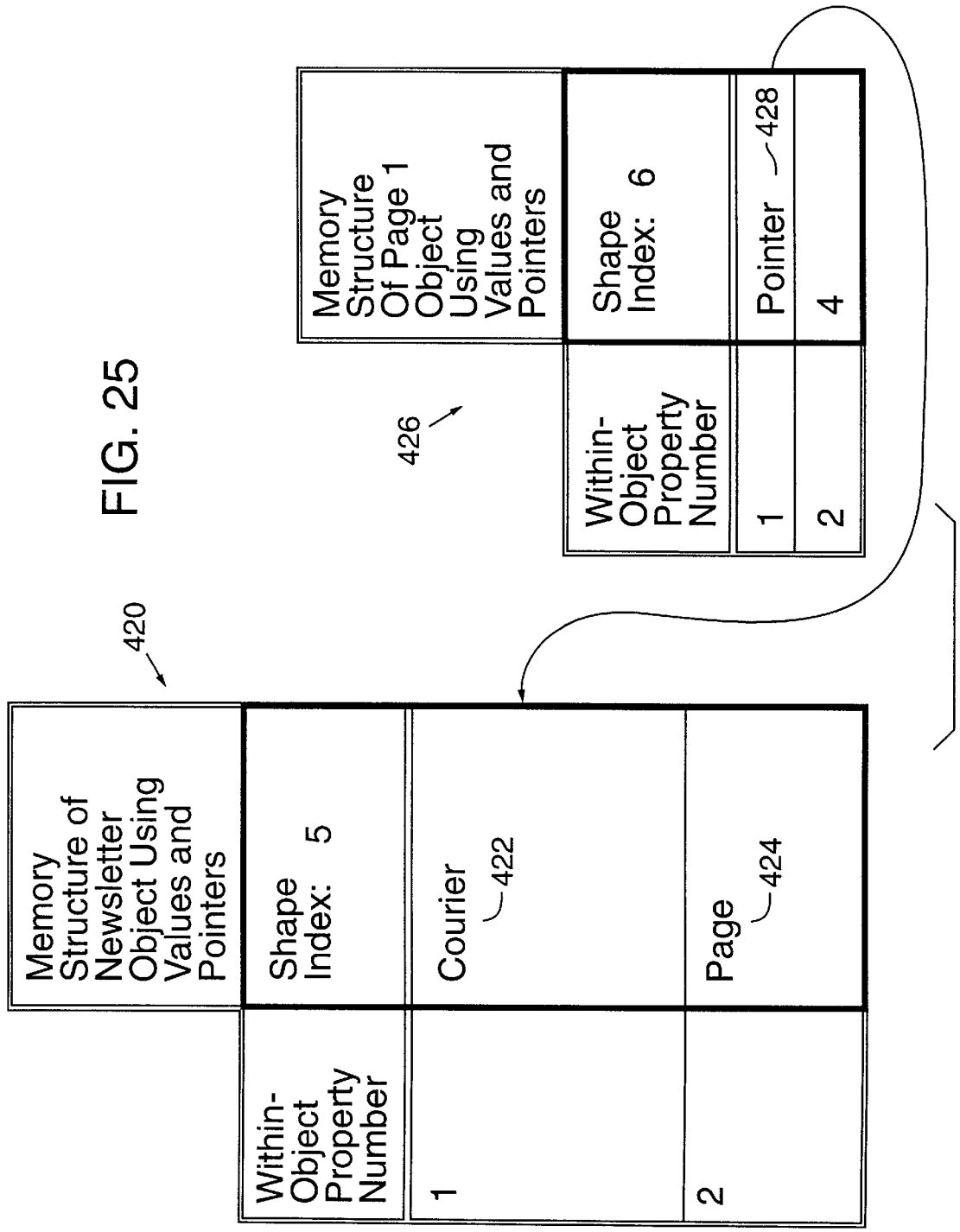
FIG. 25 shows how properties are inherited in an embodiment using object memory structures of the type shown in FIG. 12.

FIG. 25 shows an example of inheritance of properties. A Newsletter object 420 has a Font property 422 and a Page property 424. An object Page1 426 includes a Font property 428. A typical object declaration would appear as:

```
Object Newsletter
{       Facet Typestyle
                Property Page Component
                Property Font
}
Object Page1
{       Facet Typestyle
                Property Font Inherited
                Property Columns
}
```

The object Page1 is placed in the Page slot of the Newsletter object by an expression such as:

Newsletter.Page=Page1

In the declaration of Page1 object 424, its Font property 428 was declared as being inherited from its parent. A property that will be inherited through a has-a hierarchy from a parent container is referred to herein as an "ambient" property because its value is determined by its ambient environment. FIG. 25 shows that the value for Font property 428 in object memory structure 206 (FIG. 12) for Page1 object 424 is a pointer to a Font property 422 entry in object memory structure 206 for Newsletter object 420.

In the second embodiment described above, which uses object memory structure 246 shown in FIG. 14, property values are inherited by setting the values in object memory structure 246 to point to the corresponding property in the parent object. When an attempt is made to set the value of a property in a child, the system can let the value be set, thereby removing the link to the parent property value; not allow the property to be set, thereby insisting on the inheritance; or change the value in the parent, thereby allowing the parent to inherit from the child. The first option is typically used, thereby allowing a default value from the parent to be overridden.

In the third embodiment, there are no indexed vectors of property values or pointers to get and set handler methods. All values are retrieved or set using methods that are bound at run-time using a method look-up table for each object. The methods used to get an inherited property, therefore, are defined to call the method used in the parent. As in the previous embodiment, the set function can return a NULL value, thereby preventing overriding the inherited value, or the set function can set a value and then modify the get function so that it returns the value, rather than returning the parent value.

The inheritance techniques described above provide one-way containment inheritance, that is, the value of the property in the parent becomes the value of the property in the child, but changes in a value in the child do not change the value in the parent. The invention can be implemented to allow changes in a child to flow upward into a parent. The invention can also be implemented so that identity of Facet™-type property subgroups names between the parent and child object are not prerequisites for inheritance. The structure of the Facet™-type property subgroups of each object can be maintained in a symbol table created by the compiler by known techniques.

The shape of an object is typically independent of its Facet™-type property subgroup structure. That is, if behavior is defined for the shape (FontSize, Filled), the shape is applicable to Object A above, even though the properties FontSize and Filled are in two different Facet™-type property subgroups of Object A.

Thus has been described a novel data structure for an object-oriented architecture that resolves well-known problems in standard object-oriented programming of encapsulation of objects, inheritance order, granularity, and containment hierarchy. In the present invention, inheritance is controlled at the object that is inheriting. A programmer can declare which properties will be inherited from which parent, whether the properties are inherited through an is-a or a has-a hierarchy. The programmer no longer needs to know and analyze the structures of ancestor objects and arbitration rules to determine what an object inherits. The invention, therefore, creates a uniquely extensible, scalable application development architecture and is widely applicable to application designs using objects.

The invention corrects the class architecture so that it is unnecessary to rely upon methods of typing or identifying objects using class instance, object prototype, or single containment tree architectures. The invention avoids known methods of resolving the resulting problems using parent class recording, declarative inheritance, custom coding, and overriding, which introduce complexity into the software and do not resolve the underlying problems in the language architecture.

The invention modifies the object-oriented language architecture itself to permit the inheritance of methods and properties from multiple containment hierarchies in addition to standard methods using class objects, inheritance, or declaration. This is a significant complement to the historical use of class instance, object prototypes, and single containment trees to define objects. Not only does the use of multiple containment hierarchies resolve the problems of standard object-oriented programming language architectures discussed above, it enables a greatly improved programming architecture with dynamic type identification, inheritance with granularity of a single method or property, and dynamic method inheritance.

Standard object-oriented programming uses inheritance and encapsulation to determine whether an object is a member of a set of objects with shared properties. If two objects point to the same parent, they are "made the same." In the present invention, identity is determined only by reference to the properties of the two objects being compared. If two objects share the same set of properties, then they "hold the same set." This invention does not care how the object was made (standard inheritance remains one possible source for object attributes).

Methods associated with the object are derived similarly, based solely on the property sets the object contains. Methods are derived independent from the containment hierarchy of the object. This is desirable because objects often cooperate or exist within several environments at the same time and the behavior or properties required depend on the context presented by these environments. For example, a graphic object such as a pie chart may derive properties or behavior from its page (placement, caption size), from its publication type (newsletter or HTML), and from its current output device (printer or display screen). This problem is difficult to solve using a single containment tree, which is the current practice. In the present invention, all classification hierarchies are available to the programmer and no specialized code is required to generate objects with object definition granularized to the level of single properties and methods. The Facet™-type property subgroups architecture declares the organization of an object independent of its methods to permit objects to change dynamically without destroying encapsulation or requiring custom coding.

In this way, an application can express how an object's properties can be combined, including ambiguities, without private overriding of methods inherited from a parent class or paternalistic mixing order rules. This architecture makes object-oriented programming the application programmer's domain; the programmer can focus on the application's architecture, rather than demanding expertise in dealing with class libraries.

The system of invention can be embodied in an article of manufacture comprising a computer usable storage medium. Such media include magnetic, optical, and silicon articles including diskettes, CD ROMs, and programmable and non-programmable read-only memory.

It will be obvious that many changes may be made to the above-described details of the invention without departing from the underlying principles thereof. For example, in the embodiments described above, objects once defined do not go out of scope, i.e., objects defined in one part of a program remain defined throughout the program. It will be understood that the invention could be implemented in a manner such that objects have scope and corresponding entries in the shape table and the property name table are removed when the last object having the particular shape or property goes out of scope. The invention is generally applicable to any software entity or construct that has properties and behavior, and the term "object" as used herein is not to be construed as being limited to any of its various formal definition in different computer languages or models. The breadth of the present invention should, therefore, be determined only by the following claims.

We claim:

1. An object-oriented method for controlling execution of a program in a digital computer, comprising the steps of:

defining a software object having one or more named properties;

defining a software method implementing a predetermined behavior without associating the software method with any particular class of software objects;

including in the definition of the software method an associated set of properties;

comparing the associated set of properties of the software method to the named properties of the software object; and if the associated set of properties of the software method matches the named properties of the software object, executing the software method by applying the software method to the software object, whereby the behavior implemented by the software method is triggered by the properties of the software object.

2. A method according to claim 1 and further comprising:

defining a selected condition for the software method;

if the associated set of properties of the software method matches the named properties of the software object, testing for the defined condition; and executing the software method only if the defined condition also is satisfied.

3. A method according to claim 2 wherein the condition includes a selected one of the set of properties together with a predetermined value of the selected property; and said testing step includes determining whether the software object has a current value of the selected property equal to the predetermined value.

4. A method according to claim 1 wherein said comparing step includes determining whether the associated set of properties defining the software method is a subset of the named properties of the software object; and said executing step comprises executing the software method if the associated set of properties defining the software method is a subset of the named properties of the software object.

5. A method according to claim 4 and further comprising:

defining a selected condition for the software method;

if the associated set of properties of the software method is a subset of the named properties of the software object, testing for the defined condition; and executing the software method only if the defined condition also is satisfied.

6. A method according to claim 5 wherein the condition includes a selected one of the set of properties together with a predetermined value of the selected property; and said testing step includes determining whether the software object has a current value of the selected property equal to the predetermined value.

* * * * *